(12) United States Patent
Doi

(10) Patent No.: US 7,580,479 B2
(45) Date of Patent: *Aug. 25, 2009

(54) RECEIVING METHOD AND RECEIVER

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 89 days.

This patent is subject to a terminal disclaimer.

(21) Appl. No.: 11/487,323

(22) Filed: Jul. 17, 2006

(65) Prior Publication Data

US 2006/0256900 A1 Nov. 16, 2006

Related U.S. Application Data

(62) Division of application No. 10/716,495, filed on Nov. 20, 2003, now Pat. No. 7,453,955.

(30) Foreign Application Priority Data

Nov. 20, 2002 (JP) ............................ 2002-337307

(51) Int. Cl.
*H03K 9/00* (2006.01)
*H04L 27/00* (2006.01)

(52) U.S. Cl. ................. 375/316; 375/142; 375/150; 375/343; 375/347; 375/319

(58) Field of Classification Search ......... 375/231–232, 375/347, 349, 351
See application file for complete search history.

(56) References Cited

U.S. PATENT DOCUMENTS

| | | | |
|---|---|---|---|
| 4,203,071 A | 5/1980 | Bowles et al. | |
| 5,875,216 A | 2/1999 | Martin | |
| 5,887,037 A | 3/1999 | Golden et al. | |
| 6,044,120 A | 3/2000 | Bar-David et al. | |
| 6,085,076 A | 7/2000 | Lindsay et al. | |

(Continued)

FOREIGN PATENT DOCUMENTS

JP      11-039378       2/1999

(Continued)

OTHER PUBLICATIONS

Japanese Office Action issued in corresponding Japanese Patent Application No. 2002-337307 dated Dec. 26, 2006.

(Continued)

*Primary Examiner*—Curtis B Odom
(74) *Attorney, Agent, or Firm*—McDermott Will & Emery LLP

(57) ABSTRACT

Baseband BB input units input baseband received signals. An initial weight data setting unit sets weighting coefficients to be utilized in the interval of a training signal as initial weighting coefficients. A gap compensating unit compensates control weighting coefficients with a gap error signal and outputs the updated weighting coefficients acquired as a result of the compensation. A weight switching unit selects the initial weighting coefficients in the interval of the training signal and selects the updated weighting coefficients in the interval of the data signal. Then the weight switching unit outputs the selected initial weighting coefficients and updated weighting coefficients as the weighting coefficients. A synthesizing unit weights the baseband received signals with the weighting coefficients and then sums them up.

16 Claims, 18 Drawing Sheets

U.S. PATENT DOCUMENTS

| | | |
|---|---|---|
| 6,115,406 A | 9/2000 | Mesecher |
| 6,147,985 A | 11/2000 | Bar-David et al. |
| 6,289,062 B1 | 9/2001 | Wang et al. |
| 6,385,181 B1 | 5/2002 | Tsutsui et al. |
| 6,404,387 B1 | 6/2002 | Kihira et al. |
| 6,560,300 B2 | 5/2003 | Mesecher |
| 6,590,532 B1 | 7/2003 | Ogawa et al. |
| 6,636,729 B1 | 10/2003 | Hiramatsu et al. |
| 6,657,590 B2 | 12/2003 | Yoshida |
| 6,687,492 B1 | 2/2004 | Sugar et al. |
| 6,804,312 B1 | 10/2004 | Win et al. |
| 7,003,054 B2 | 2/2006 | Doi |
| 7,031,413 B2 | 4/2006 | Doi |
| 7,136,438 B2 * | 11/2006 | Doi .......................... 375/347 |
| 2002/0051430 A1 | 5/2002 | Kasami et al. |
| 2002/0072343 A1 | 6/2002 | Miyatani |
| 2003/0027599 A1 * | 2/2003 | Frey et al. ................... 455/562 |
| 2003/0146870 A1 * | 8/2003 | Guo et al. ................... 342/383 |
| 2004/0001554 A1 | 1/2004 | Sun et al. |
| 2004/0008614 A1 | 1/2004 | Matsuoka et al. |
| 2004/0101073 A1 | 5/2004 | Doi |
| 2004/0106386 A1 | 6/2004 | Doi |
| 2004/0132430 A1 | 7/2004 | Shino et al. |
| 2004/0165675 A1 | 8/2004 | Ito et al. |
| 2004/0176137 A1 | 9/2004 | Doi |
| 2004/0179495 A1 | 9/2004 | Ramakrishnan et al. |
| 2004/0229650 A1 | 11/2004 | Fitton et al. |
| 2005/0070333 A1 | 3/2005 | Doi |
| 2005/0078649 A1 | 4/2005 | Tehrani et al. |
| 2005/0096001 A1 | 5/2005 | Kandala |
| 2006/0256899 A1 | 11/2006 | Doi |
| 2006/0256901 A1 | 11/2006 | Doi |
| 2006/0256902 A1 | 11/2006 | Doi |
| 2006/0256903 A1 | 11/2006 | Doi |
| 2006/0256904 A1 | 11/2006 | Doi |
| 2006/0256905 A1 | 11/2006 | Doi |
| 2007/0147545 A1 | 6/2007 | Doi |

FOREIGN PATENT DOCUMENTS

| | | |
|---|---|---|
| JP | 2000-22569 | 1/2000 |
| JP | 2000-252734 | 9/2000 |
| JP | 2001-196978 | 7/2001 |
| JP | P2002-026788 | 1/2002 |
| JP | 2002-101030 | 4/2002 |
| JP | 2002-185375 | 6/2002 |

OTHER PUBLICATIONS

U.S. Appl. No. 11/094,221, filed Mar. 31, 2005, Yoshiharu Doi.
U.S. Appl. No. 11/094,220, filed Mar. 31, 2005, Yoshiharu Doi.
U.S. Appl. No. 11/094,370, filed Mar. 31, 2005, Yoshiharu Doi.
Foreign Office Action (w/English Translation) Applicant: Sanyo Electric Co., Ltd., Patent Agent: Ruifeng Chen Application No. 200310118026.8 Title of Invention: Receiving Method and Receiver, Issuing Date: Jan. 6, 2006.
Japanese Office Action, with English Translation, issued in corresponding Japanese Patent Application No. 2002-337307, dated on Apr. 27, 2007.
Chinese Office Action issued for corresponding Chinese Patent Application No. 200310118026.8, dated Jun. 23, 2006.
Japanese Office Action, with English Translation, issued in Japanese Patent Application No. 2006-268422 dated May 27, 2008.
Japanese Office Action, with English Translation, issued in Japanese Patent Application No. 2006-268423 dated May 27, 2008.
Japanese Office Action, with English Translation, issued in Japanese Patent Application No. 2006-268424 dated May 27, 2008.
Japanese Office Action, with English Translation, issued in Japanese Patent Application No. 2006-268425 dated May 27, 2008.

* cited by examiner

RECEIVING METHOD AND RECEIVER

RELATED APPLICATION:

This application is a divisional application of Ser. No. 10/716,495, filed Nov. 20, 2003, now U.S. Pat. No. 7,453,955 which claims priority of Japanese Patent application No. 2002-337,307, filed Nov. 20, 2002, and the contents of which are herewith incorporated by reference.

BACKGROUND OF THE INVENTION

1. Field of the Invention

The present invention relates to a receiving technology. It particularly relates to a receiving method and a receiving apparatus which controls a weighting coefficient for synthesizing radio signals received by a plurality of antennas.

2. Description of the Related Art

In wireless communication, it is in general desired to effectively use limited frequency resources. In order to use the frequency resources effectively, radio waves of same frequency are, for example, utilized as repeatedly as possible in short-range. In this case, however, communication quality degrades because of cochannel interference caused by a radio base station or mobile terminal closely located, which utilizes the same frequency. As one technology for preventing such communication quality degradation deriving from the cochannel interference, the adaptive array antenna technology can be named.

In the adaptive array antenna technology, signals received by a plurality of antennas are respectively weighted with different weighting coefficients and synthesized. The weighting coefficients are adaptively updated so that an error signal between a signal to be transmitted and the signal after the synthesis might be small. Here, the signal to be transmitted is determined based on the signal after synthesis. In order to update the weighting coefficients adaptively, the RLS (Recursive Least Squares) algorithm, the LMS (Least Mean Squares) algorithm or the like is utilized. The RLS algorithm generally converges at high speed. The RLS algorithm, however, requires a high speed or a huge arithmetic circuit since computation performed is very complicated. The LMS algorithm can be realized with a simpler arithmetic circuit than that of the RLS algorithm. However, the convergence speed thereof is low.

Related Art List

1. Japanese Patent Application Laid-open No. 2002-26788

In utilizing the adaptive array antenna for a radio mobile terminal, it is suitable to use the LMS algorithm for updating weighting coefficients, since it is desirable that an arithmetic circuit is small. However, the convergence speed of the LMS algorithm is low in general. Thus, if it is desired to delay received signals to be synthesized until the LMS algorithm converges, processing delay becomes large and therefore it is possibly impossible to use the adaptive array antenna in a real time application such as TV conference system where permissible delay time is limited. On the other hand, a response characteristic generally degrades if the weighting coefficients at the timing where the LMS algorithm has not converged yet in order to diminish the processing delay.

SUMMARY OF THE INVENTION

The inventor of the present invention has made the present invention in view of the foregoing circumstances and an object thereof is to provide a receiver having simple arithmetic circuits, of which the processing delay is small. It is also an object of the present invention to provide a receiver of which the response characteristic hardly degrades even in the case the weighting coefficients have not converged yet. Moreover, it is also an object of the present invention to provide a receiver which can switch a plural types of weighting coefficients.

A preferred embodiment according to the present invention relates to a receiver. This receiver includes: an input unit which inputs a plurality of signals on which a processing is to be performed; a switching unit which switches a plurality of weighting coefficients by which the plurality of inputted signals are multiplied between a plurality of first weighting coefficients to be temporarily utilized and a plurality of second weighting coefficients which have higher adaptabilities; a controller which instructs the switching unit to switch the weighting coefficients between the plurality of first weighting coefficients and the plurality of second weighting coefficients; and a synthesizer which synthesizes results of multiplications, where the multiplications are performed on the plurality of inputted signals and the plurality of weighting coefficients.

The plurality of weighting coefficients include (A, B, C, D) of which the number of terms is equal to that of the plurality of signals, where the results of multiplications between them and (X1, Y1), (X2, Y2) become (AX1, BY1) and (CX2, DY2). The plurality of weighting coefficients also include (A, B) of which the number of terms is different from that of the plurality of signals, where the results of multiplications become (AX1, BY1) and (AX2, BY2).

The receiver described above enables to acquire a response characteristic optimal in each timing by switching the weighting coefficients which have different characteristics.

Another preferred embodiment of the present invention also relates to a receiver. The receiver includes: an input unit which inputs a plurality of signals on which a processing is to be performed; a switching unit which switches a plurality of weighting coefficients by which the plurality of inputted signals are multiplied between a plurality of first weighting coefficients and a plurality of second weighting coefficients; a controller which instructs the switching unit to switch the weighting coefficients between the plurality of first weighting coefficients and the plurality of second weighting coefficients in a prescribed interval, where the plurality of signals are inputted in a sequential manner during the interval; and a synthesizer which synthesizes results of multiplications, where the multiplications are performed on the plurality of inputted signals and the plurality of weighting coefficients.

The "sequential manner" merely means that the known received signal is sequential. As long as the signals are inputted sequentially, the time length does not necessarily need to be long but may be short. Moreover, the sequential manner here may include a case where the signals are inputted in a discrete manner in accordance with a certain rule, if the apparatus recognizes the rule. That is, the "sequential manner" here includes every case where the receiver can recognize the manner of inputting the signals as "sequential" one.

The plurality of first weighting coefficients may be set in a manner that, as results of multiplications by the plurality of inputted signals, a multiplication result corresponding to one signal among the plurality of inputted signals becomes effective. The one signal among the plurality of inputted signals may be a signal having a largest value among the plurality of inputted signals. The plurality of first weighting coefficients may be set by utilizing the plurality of second weighting coefficients which have already been set.

The receiver may further include: a weighting coefficient updating unit which updates a plurality of third weighting coefficients adaptively based on the plurality of inputted signals; a gap estimator which estimates gaps between the plurality of first weighting coefficients and the plurality of third weighting coefficients by performing a correlation processing between at least one of the plurality of inputted signals and a known signal; and a gap compensator which generates the plurality of second weighting coefficients by compensating the plurality of third weighting coefficients based on the estimated gaps.

The signals inputted during the prescribed interval in the sequential manner may include signals having different characteristics and the controller may instruct to switch the weighting coefficients between the first weighting coefficients and the second weighting coefficients when it is detected a shift point where the characteristics of the signals change. The controller may input sequentially the plurality of third weighting coefficients updated in the weight coefficient updating unit and may instruct the switching unit to switch the weighting coefficients between the first weighting coefficients and the second weighting coefficients when fluctuation of the plurality of third weighting coefficients converges within a prescribed range.

The receiver described above enables to acquire a response characteristic optimal in each time by switching the weighting coefficients which have different characteristics during the interval.

Still, another preferred embodiment according to the present invention relates to a receiving method. This method includes: inputting a plurality of signals on which a processing is to be performed; switching a plurality of weighting coefficients by which the plurality of inputted signals are multiplied between a plurality of first weighting coefficients to be temporarily utilized and a plurality of a second weighting coefficients which have higher adaptabilities; giving an instruction of switching the weighting coefficients between the plurality of first weighting coefficients and the plurality of second weighting coefficients; and synthesizing results of multiplications, where the multiplications are performed on the plurality of inputted signals and the plurality of weighting coefficients.

Still another preferred embodiment according to the present invention relates to a receiving method. This method includes: inputting a plurality of signals on which a processing is to be performed; switching a plurality of weighting coefficients by which the plurality of inputted signals are multiplied between a plurality of first weighting coefficients and a plurality of second weighting coefficients; giving an instruction of switching the weighting coefficients between the plurality of first weighting coefficients and the plurality of second weighting coefficients in a prescribed interval, where the plurality of signals are inputted in a sequential manner during the interval; and synthesizing results of multiplications, where the multiplications are performed on the plurality of inputted signals and the plurality of weighting coefficients.

The plurality of first weighting coefficients may be set in a manner that, as results of multiplications by the plurality of inputted signals, a multiplication result corresponding to one signal among the plurality of inputted signals becomes effective. The one signal among the plurality of inputted signals may be a signal having a largest value among the plurality of inputted signals. The plurality of first weighting coefficients may be set by utilizing the plurality of second weighting coefficients which have already been set.

The receiving method may further include: updating a plurality of third weighting coefficients adaptively based on the plurality of inputted signals; estimating gaps between the plurality of first weighting coefficients and the plurality of third weighting coefficients by performing a correlation processing between at least one of the plurality of inputted signals and a known signal; and generating the plurality of second weighting coefficients by compensating the plurality of third weighting coefficients based on the estimated gaps.

The signals inputted during the prescribed interval in the sequential manner may include signals having different characteristics. In giving the instruction of switching the weighting coefficients between the first weighting coefficients and the second weighting coefficients, the instruction may be given when it is detected a shift point where the characteristics of the signals change. The plurality of third weighting coefficients updated may be inputted sequentially in giving the instruction of switching the weighting coefficients between the first weighting coefficients and the second weighting coefficients, and the instruction may be given when fluctuation of the plurality of third weighting coefficients converges within a prescribed range.

Yet another preferred embodiment of the present invention relates to a program. The program includes: inputting a plurality of signals on which a processing is to be performed; switching a plurality of weighting coefficients by which the plurality of inputted signals are multiplied between a plurality of first weighting coefficients to be temporarily utilized and a plurality of a second weighting coefficients which have higher adaptabilities; giving an instruction of switching the weighting coefficients between the plurality of first weighting coefficients and the plurality of second weighting coefficients; and synthesizing results of multiplications, where the multiplications are performed on the plurality of inputted signals and the plurality of weighting coefficients.

Still another preferred embodiment according to the present invention relates to a program method. This program includes: inputting a plurality of signals on which a processing is to be performed; switching a plurality of weighting coefficients by which the plurality of inputted signals are multiplied between a plurality of first weighting coefficients and a plurality of second weighting coefficients; giving an instruction of switching the weighting coefficients between the plurality of first weighting coefficients and the plurality of second weighting coefficients in a prescribed interval, where the plurality of signals are inputted in a sequential manner during the interval; and synthesizing results of multiplications, where the multiplications are performed on the plurality of inputted signals and the plurality of weighting coefficients.

The plurality of first weighting coefficients may be set in a manner that, as results of multiplications by the plurality of inputted signals, a multiplication result corresponding to one signal among the plurality of inputted signals becomes effective. The one signal among the plurality of inputted signals may be a signal having a largest value among the plurality of inputted signals. The plurality of first weighting coefficients may be set by utilizing the plurality of second weighting coefficients which have already been set.

The receiving method may further include: updating a plurality of third weighting coefficients adaptively based on the plurality of inputted signals; estimating gaps between the plurality of first weighting coefficients and the plurality of third weighting coefficients by performing a correlation processing between at least one of the plurality of inputted signals and a known signal; and generating the plurality of second weighting coefficients by compensating the plurality of third weighting coefficients based on the estimated gaps.

The signals inputted during the prescribed interval in the sequential manner may include signals having different characteristics. In giving the instruction of switching the weighting coefficients between the first weighting coefficients and the second weighting coefficients, the instruction may be given when it is detected a shift point where the characteristics of the signals change. The plurality of third weighting coefficients updated may be inputted sequentially in giving the instruction of switching the weighting coefficients between the first weighting coefficients and the second weighting coefficients, and the instruction may be given when fluctuation of the plurality of third weighting coefficients converges within a prescribed range.

It is to be noted that any arbitrary replacement or substitution of the above-described structural components and the steps, expressions replaced or substituted in part or whole between a method and an apparatus as well as addition thereof, and expressions changed to a computer program, recording medium or the like are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

FIRST EMBODIMENT

The first embodiment of the present invention relates to a receiver provided with an adaptive array antenna which receives radio signals with a plurality of antennas as burst signals and synthesizes the received signals with weighting them respectively by different weighting coefficients. The burst signal is composed of a known training signal which is disposed in the head part thereof and a data signal. The receiver, in order to reduce processing delay, synthesizes the received signals by weighting them with the weighting coefficients without scarcely delaying them. The weighting coefficients are updated by the LMS algorithm one after another. As the weighting coefficients in the training signal interval, however, precedently prepared weighting coefficients of an omni antenna pattern are utilized since it is often the case that the weighting coefficients have not converged yet in the initial period of the training signal interval. Weighting coefficients of adaptive array antenna pattern, which are updated by the LMS algorithm, are utilized as the weighting coefficients in the interval of the data signal.

Figure 1:
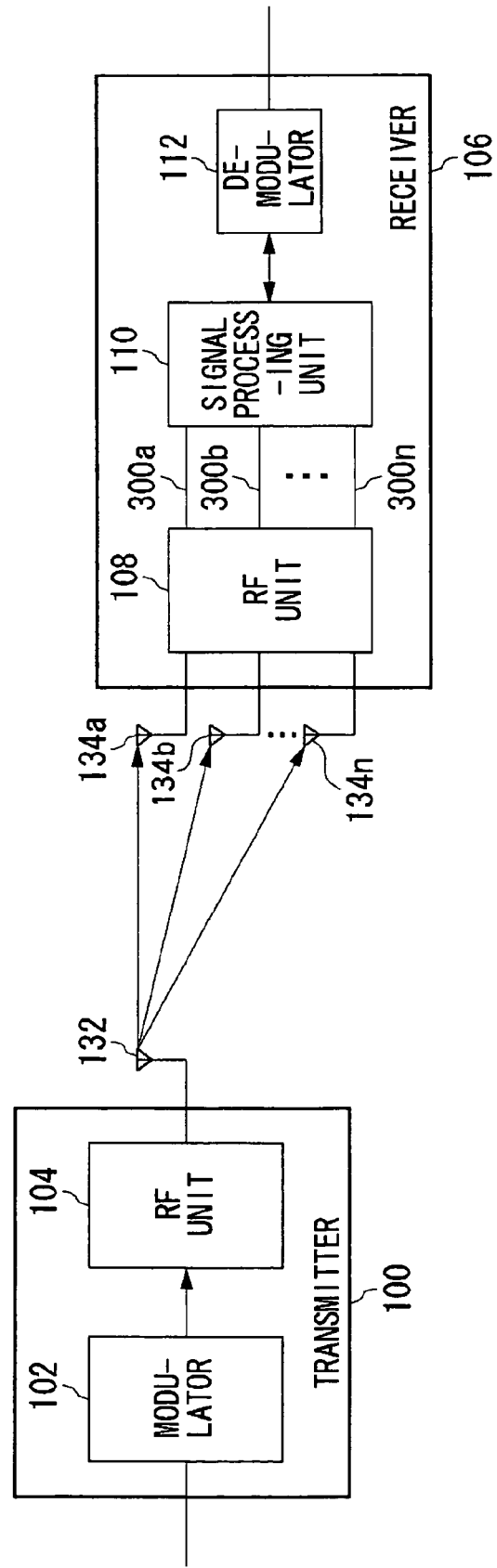
FIG. 1 shows a structure of a communication system according to a first embodiment of the present invention.

FIG. 1 shows a communication system including a transmitter 100 and a receiver 106 according to the first embodiment of the present invention. The transmitter 100 includes a modulator 102, a RF unit 104, and an antenna 132. The receiver 106 includes a first antenna 134a, a second antenna 134b, a n-th antenna 134n, a RF unit 108, a signal processing unit 110, and a demodulator 112. Here the first antenna 134a, the second antenna 134b and the n-th antenna 134n are generically named antennas 134.

The modulator 102 modulates an information signal to be transmitted and generates the transmission signal (hereinafter one signal included in the transmission signal is also called as a "symbol"). Any arbitrary modulation scheme may be utilized, such as QPSK (Quadri Phase Shift Keying), 16QAM (16 Quadrature Amplitude Modulation), GMSK (Gaussian filtered Minimum Shift Keying). In the following embodiments, examples are described where the QPSK is utilized. Moreover, in a case of a multi carrier communication, the transmitter 100 is provided with the plurality of modulators 102 or inverse Fourier transform units. In a case of a spectrum spreading communication, the modulator 102 is provided with a spreading unit.

The RF unit 104 transforms the transmission signal into radio frequency signal. A frequency transformation unit, a power amplifier, a frequency oscillator and so forth are included therein.

The antenna 132 of the transmitter 100 transmits the radio frequency signals. The antenna may have arbitrary directivity and the number of the antennas may also be arbitrary.

The antennas 134 of the receiver 106 receive the radio frequency signals. In this embodiment, the number of the antennas 134 is n. When it is described in this embodiment that the receiver has a n-th component thereof, it means that the number of the components provided to the receiver 106 is same as the number of the antennas 134, where the first, second, ... n-th component basically performs same operation in parallel.

The RF unit 108 transforms the radio frequency signals into baseband received signals 300. A frequency oscillator and so forth are provided to the RF unit 108. In a case of the multi carrier communication, the RF unit 108 is provided with a Fourier transform unit. In a case of the spectrum spreading communication, the RF unit 108 is provided with a despreading unit.

The signal processing unit 110 synthesizes the baseband received signals 330 with respectively weighting by the weighting coefficients and controls each weighting coefficient adaptively.

The demodulator 112 demodulates the synthesized signals and performs decision on the transmitted information signal. The demodulator 112 may also be provided with a delay detection circuit or a carrier recovery circuit for coherent detection.

Figure 2:
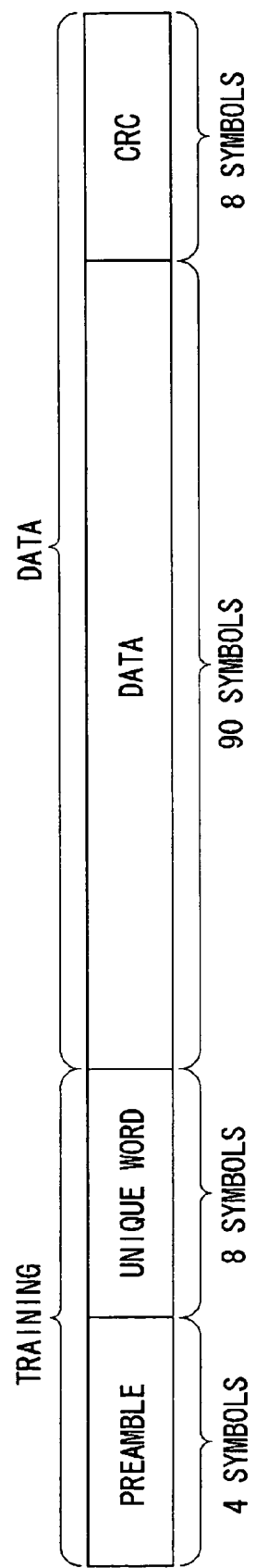
FIG. 2 shows a burst format according to the first embodiment of the present invention.
Figure 3:
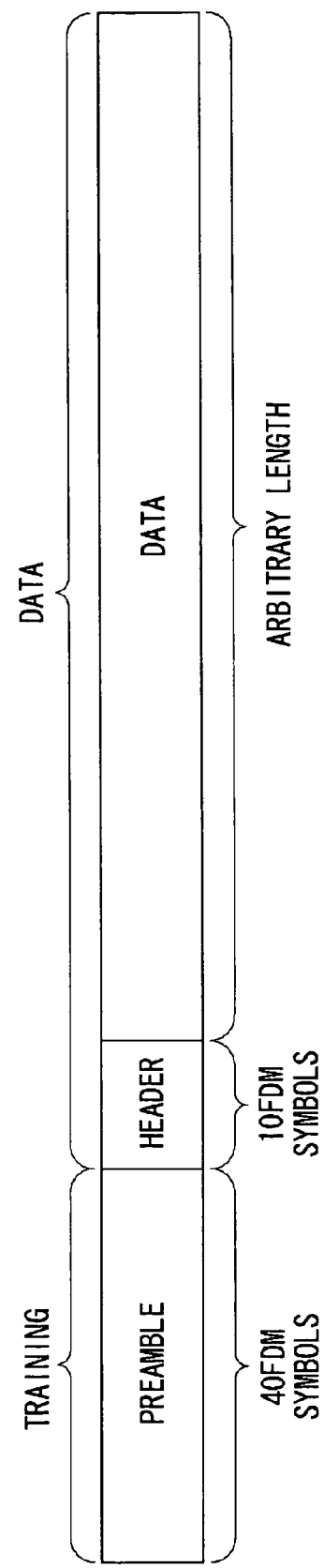
FIG. 3 shows a burst format according to the first embodiment of the present invention.

FIG. 2 and FIG. 3 show other burst formats respectively utilized in different communication systems corresponding to the communication system shown in FIG. 1. Training signals and data signals included in the burst signals are also shown in those figures. FIG. 2 shows a burst format utilized in a traffic channel of the Personal Handyphone System. A preamble is placed in initial 4 symbols of the burst, which is utilized for timing synchronization. The signals of the preamble and a unique word can serve as a known signal for the signal processing unit 110, therefore the signal processing unit 110 can utilize the preamble and the unique word as the training signal. Data and CRC both following after the preamble and the unique word are unknown for the signal processing unit 110 and correspond to the data signal.

FIG. 3 shows a burst format utilized in a traffic channel of the IEEE 802.11a, which is one type of wireless LAN (Local Area Network). The IEEE 802.11a employs OFDM (Orthogonal Frequency Division Multiplexing) modulation scheme. In the OFDM modulation scheme, the size of the Fourier transform and the number of the symbols of the guard interval are summated and the summation forms a unit. It is to be noted that this one unit is described as an OFDM symbol in this embodiment. A preamble is placed in initial 4 OFDM symbols of the burst, which is mainly utilized for timing synchronization and carrier recovery. The signals of the preamble can serve as a known signal for the signal processing unit 110, therefore the signal processing unit 110 can utilize the preamble as the training signal. Header and Data both following after the preamble are unknown for the signal processing unit 110 and correspond to the data signal.

Figure 4:
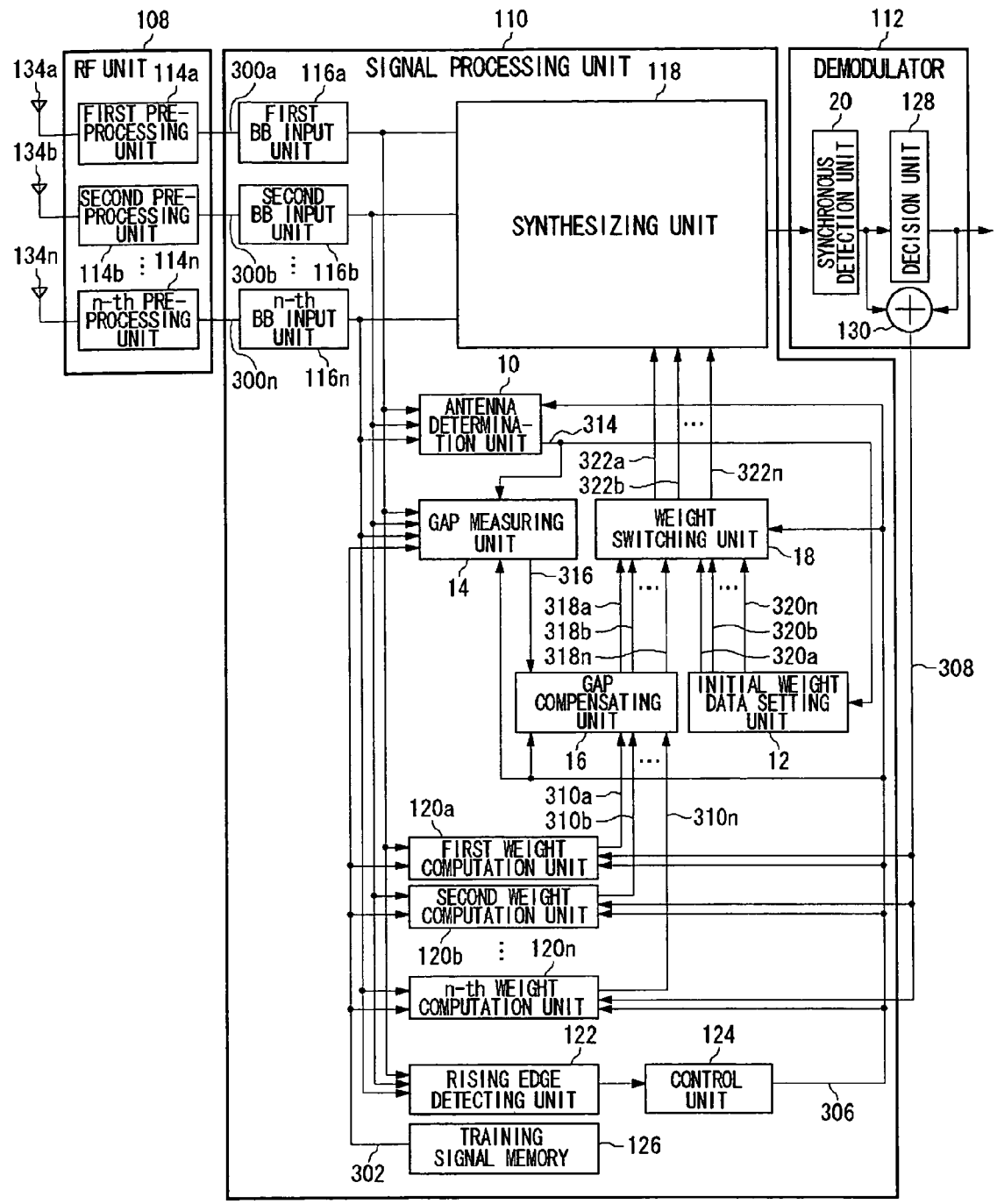
FIG. 4 shows a structure of a receiver according to the first embodiment of the present invention.

FIG. 4 shows a structure of the receiver 106 shown in FIG. 1. The RF unit 108 includes a first pre-processing unit 114a, a second pre-processing unit 114b, ... and a n-th pre-processing unit 114n, which are generically named pre-processing units 114. The signal processing unit 110 includes: a first BB input unit 116a, a second BB input unit 116b, ... and a n-th BB input unit 116n which are generically named BB input units 116; a synthesizing unit 118; a first weight computation unit 120a, a second weight computation unit 120b, ... and a n-th weight computation unit 120n which are generically named weight computation units 120; a rising edge detection unit 122; a control unit 124; a training signal memory 126; an antenna determination unit 10; an initial weight data setting unit 12; a gap measuring unit 14, a gap compensating unit 16; a weight switching unit 18. The demodulator 112 includes a synchronous detection unit 20, a decision unit 128 and a summing unit 130.

Moreover the signals utilized in the receiver 106 include: a first baseband received signal 300a, a second baseband received signal 300b, ... and n-th baseband received signal 300n which are generically named the baseband received signals 300; a training signal 302; a control signal 306; an error signal 308; a first control weighting coefficient 310a, a second control weighting coefficient 310b, ... and a n-th control weighting coefficient 310n which are generically named control weighting coefficients 310; an antenna selection signal 314; a gap error signal 316; a first updated weighting coefficient 318a, a second updated weighting coefficient 318b, ... and a n-th updated weighting coefficient 318n which are generically named updated weighting coefficients 318; a first initial weighting coefficient 320a, a second initial weighting coefficient 320b, ... and a n-th initial weighting coefficient 320n which are generically named initial weighting coefficients 320; and a first weighting coefficient 322a, a second weighting coefficient 322b, ... and a n-th weighting coefficient 322n which are generically named weighting coefficients 322.

The pre-processing units 114 translates the radio frequency signals into the baseband received signals 300.

The rising edge detection unit 122 detects the starts of the burst signals which serve as a trigger of the operation of the signal processing unit 110 from the baseband received signals 300. The timings of the detected starts of the burst signals are informed to the control unit 124. The control unit 124 computes timings when the interval of the training signal 302 ends, based on the timings of the starts of the burst signals. These timings are notified to each unit as control signals 306 in accordance with necessity.

The antenna determination unit 10 measures the electric power of each baseband received signal 300 after the interval of the training signal 302 is started in order to select one antenna 134 to be made effective in the interval of the training signal 302 and then determines the one baseband received signal 300 of which the electric power becomes is largest. Moreover, the antenna determination unit 10 outputs this information as the antenna selection signal 314.

The initial weight data setting unit 12 sets the weighting coefficients 322 utilized in the interval of the training signal 302 as the initial weighting coefficients 320. The initial weight data setting unit 12 makes only one initial weighting coefficient 302 effective by setting the value of the one initial weighting coefficient 320 as 1 and by setting the values of the other weighting coefficients 320 as 0. The one initial weighting coefficient 320 to be made effective is decided according to the antenna selection signal 314.

The training signal memory 126 stores the training signal 302 and outputs the training signal in accordance with necessity.

The weight computation unit 120 updates the control weighting coefficients 310 based on the baseband received signals 300 and after-mentioned error signal 308 by the LMS algorithm.

The gap measuring unit 14, based on the baseband received signals 300 and the training signal 302, estimates the gap between the results of a synthesis processing performed in the after-mentioned synthesizing unit 118, wherein one result is acquired by performing the synthesizing processing on the initial weighting coefficients 320 and baseband received signals 300 and the other is acquired by performing the synthesizing processing on the control weighting coefficients 310 and the baseband received signals 300. The synthesis result acquired by utilizing the initial weighting coefficients 320 is the baseband received signal 300 as it is, which is corresponding to one antenna 134. Therefore following expression (1) can be acquired. Here, it is presumed that the one antenna 134 is an i-th antenna 134.

$$x_i(t) = h_i S(t)\exp(j\Delta\omega t) + n_i t \qquad (1)$$

Here, hi is the response characteristic of the radio interval, S(t) is the transmission signal, $\Delta\omega$ is the frequency offset between the frequency oscillators of the transmitter 100 and the receiver 106, and ni(t) is a noise. On the other hand, a control weighting coefficient 310wi updated from the head region of the burst signal is given by:

$$\sum h_i w_i = 1 \qquad (2)$$

Here, it is presumed assumed that the control weighting coefficients have already converged sufficiently.

By performing the synthesis processing based on the ground of the above-described expression (2), following result of the synthesis processing can be acquired.

$$y(t) = S(t)\exp(j\Delta\omega t) + n(t) \qquad (3)$$

By comparing the synthesis results shown in (1) and (3), a gap error signal 316C is given by:

$$C = h_i \qquad (4)$$

The gap compensating unit 16 compensates the control weighting coefficients 310 with the gap error signal 316 and outputs the result of the compensation as the updated weighting coefficients 318.

The weight switching unit 18, based on the instruction of the control signal 306, selects the initial weighting coefficients 320 in the interval of the training signal 302 and selects the updated weighting coefficients 318 in the interval of the data signal. Then, the weight switching unit 18 outputs them as the weighting coefficients 322.

The synthesizing unit 118 weights the baseband received signals 300 with the weighting coefficients 322 and then sums them up.

The synchronous detection unit 20 performs synchronous detection on the synthesized signals and also performs a carrier recovery necessary for the synchronous detection.

The decision unit 128 decides the transmitted information signal by comparing the signal acquired by the summation to a pre-determined threshold value. The decision may be either hard or soft.

The summing unit 130 generates the error signal 308 based on the difference value between the synchronous detected signal and the decided signal, which is to be utilized in the LMS algorithm in the weight computation units 120. In an ideal situation, the error signal becomes zero since the LMS algorithm controls the weighting coefficients 310 so that the error signal 308 might become small.

Figure 5:
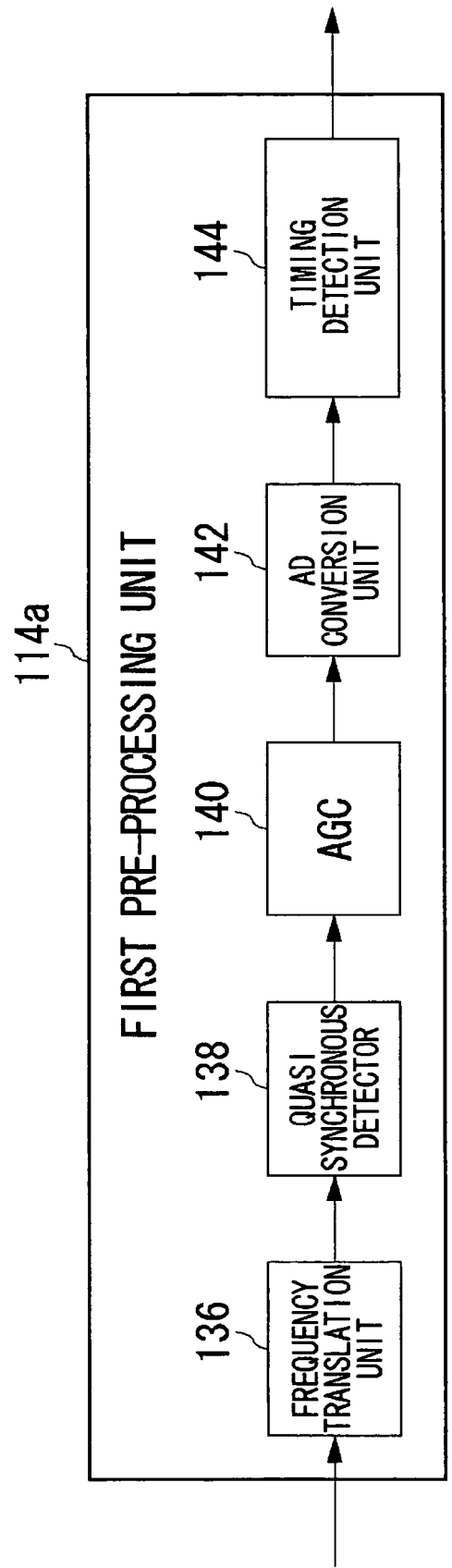
FIG. 5 shows a structure of a first pre-processing unit shown in FIG. 4.
Figure 6:
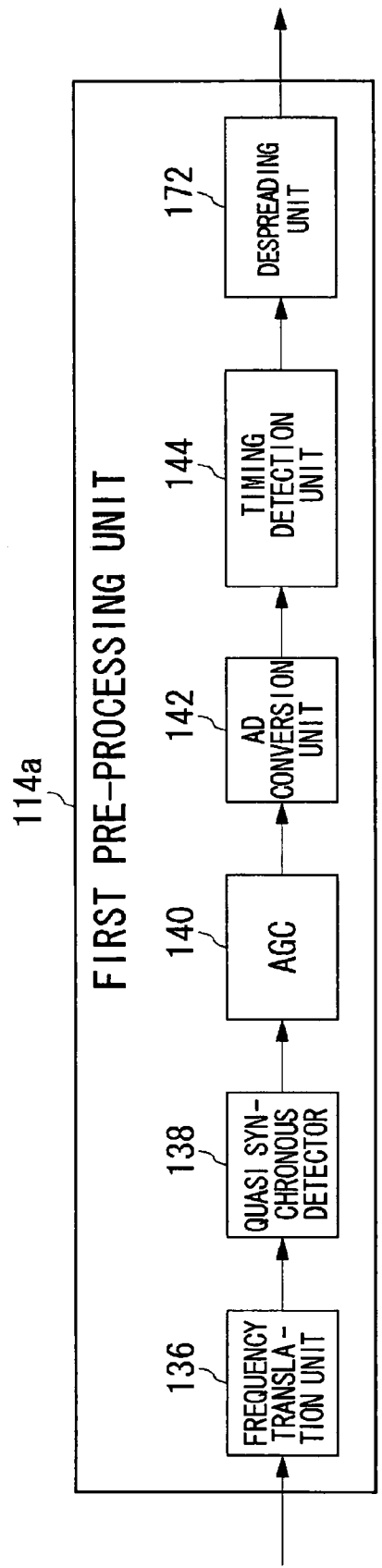
FIG. 6 shows a structure of the first pre-processing unit shown in FIG. 4.
Figure 7:
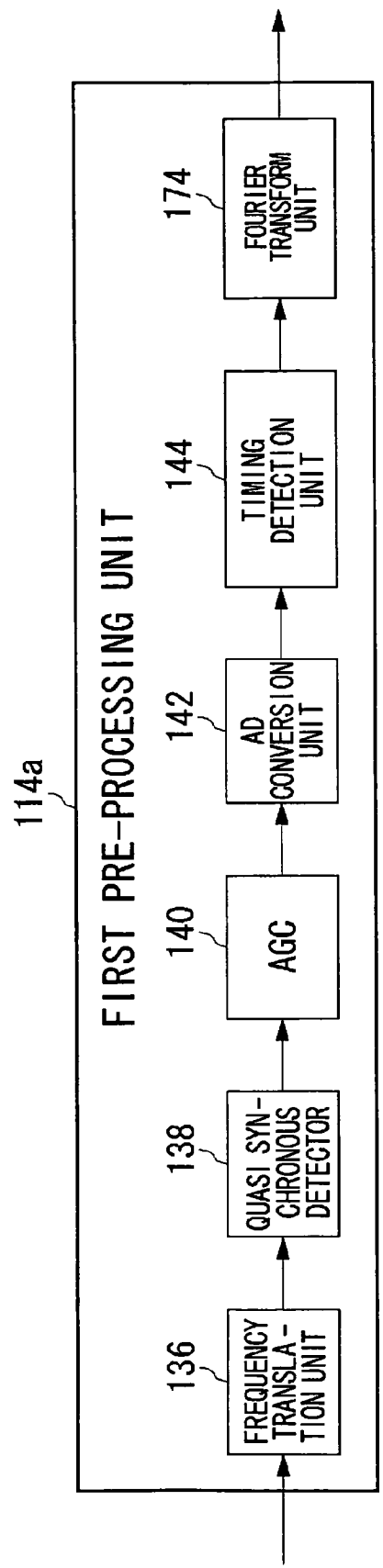
FIG. 7 shows a structure of the first pre-processing unit shown in FIG. 4.

FIG. 5 to FIG. 7 show various structures of the first pre-processing unit 114a. The first pre-processing unit 114a in the receiver 106 can accept and treat various signals in different communication systems such as shown in FIG. 2 or FIG. 3, therefore the signal processing unit 110 following thereafter can operate ignoring the difference of the communication systems. The first pre-processing unit 114a in FIG. 5 is for the single carrier communication system shown in FIG. 2 such as Personal Handyphone System, cellular phone system or the like. The first pre-processing unit 114a in FIG. 5 includes a frequency translation unit 136, a quasi synchronous detector 138, an AGC (Automatic Gain Control) 140, an AD conversion unit 142, and a timing detection unit 144. The first pre-processing unit 114a shown in FIG. 6 is for the spectrum spreading communication system such as the W-CDMA (Wideband-Code Division Multiple Access) or the wireless LAN implemented in relation to the IEEE 802.11b. In addition to the first pre-processing unit 114a shown in FIG. 5, that shown in FIG. 6 further includes a despreading unit 172. The first pre-processing unit 114a is for the multi carrier communication system shown in FIG. 3 such as the IEEE 802.11a or the Hiper LAN/2. In addition to the first pre-processing unit 114a shown in FIG. 6, that shown in FIG. 7 further includes a Fourier transform unit 174.

The frequency translation unit 136 translates the radio frequency signal into one intermediate frequency signal, a plurality of intermediate frequency signals or other signals. The quasi synchronous detector 138 performs quadrature detection on the intermediate frequency signal utilizing a frequency oscillator and generates a baseband analog signal. Since the frequency oscillator included in the quasi synchronous detector 138 operates independently from the frequency oscillator provided to the transmitter 100, the frequencies between the two oscillators differ from each other.

The AGC 140 automatically controls gains so that the amplitude of the baseband analog signal might become an amplitude within the dynamic range of the AD conversion unit 142.

The AD conversion unit 142 converts the baseband analog signal into a digital signal. Sampling interval for converting the baseband analog signal to the digital signal is generally set to be shorter than symbol interval in order to constrict the degradation of the signal. Here, the sampling interval is set to the half of the symbol interval (Hereinafter, the signal digitalized with this sampling interval is referred to as a "high speed digital signal").

The timing detection unit 144 selects a baseband received signal 300 of an optimal sampling timing from the high speed digital signals. Alternatively, the timing detection unit 144 generates the baseband received signal 300 having the optimal sampling timing by performing a synthesis processing or the like on the high speed digital signals.

The despreading unit 172 shown in FIG. 6 performs correlation processing on the baseband received signal 300 based on a predetermined code series. The Fourier transform unit 174 in FIG. 7 performs the Fourier transform on the baseband received signal 300.

Figure 8:
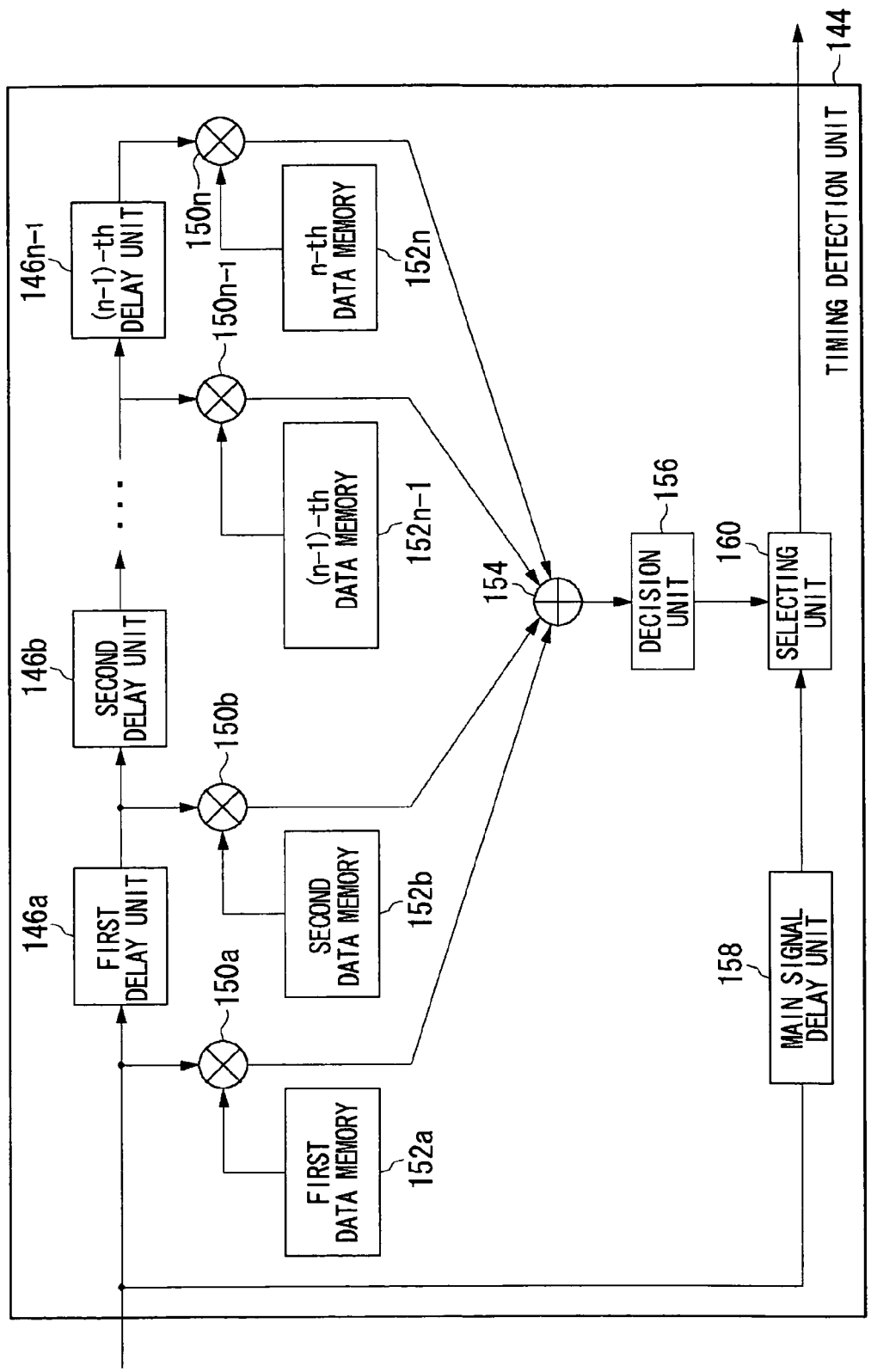
FIG. 8 shows a structure of a timing detection unit shown in FIGS. 5, 6 and 7.

FIG. 8 shows the structure of the timing detection unit 144. The timing detection unit 144 includes: a first delay unit 146a, a second delay unit 146b, ... and a (n−1)-th delay unit 146n−1 which are generically named delay units 146; a first multiplication unit 150a, a second multiplication unit 150b, a (n−1)-th multiplication unit 150n−1, ... and a n-th multiplication unit 150n which are generically named multiplication units 150; a first data memory 152a, a second data memory 152b, a (n−1)-th data memory 152n−1, ... a n-th data memory 152n which are generically named data memories 152; a summing unit 154; a decision unit 156; a main signal delay unit 158; and a selecting unit 160.

The delay units 146 delay the inputted high speed digital signal for the correlation processing. The sampling interval of the high speed digital signal is set to half of the symbol interval. However the delay quantity of the delay units 146 is set to the symbol interval, therefore the high speed digital signal 150 is outputted from every other delay unit 146 to the multiplication units 150.

The data memories 152 store 1 symbol of each preamble signal for the timing synchronism.

The multiplication units 150 perform multiplications on the high speed digital signals and the preamble signals, and the results thereof are summed up by the summing unit 154.

The decision unit 156 selects an optimal sampling timing based on the result of the summation. The sampling interval of the high speed digital signal is half of the symbol signal and the interval of the high speed digital signal utilized for the summation is equal to the symbol interval, therefore there are two types of the summation results for every other high speed digital signal corresponding to each shifted sampling timing. The decision unit 156 compares the two types of the summation results and decides a timing corresponding to larger summation result as the optimal sampling timing. This decision should not necessarily be made by comparing the two types of the summation results once, but may be made by comparing them for several times.

The main signal delay unit 158 delays the high speed digital signal until the optimal sampling timing is determined by the decision unit 156.

The selecting unit 160 selects a baseband received signal 300 corresponding to the optimal sampling timing from the high speed digital signals. Here one high speed digital signal is selected sequentially from the two successive high digital speed signals.

Figure 9:
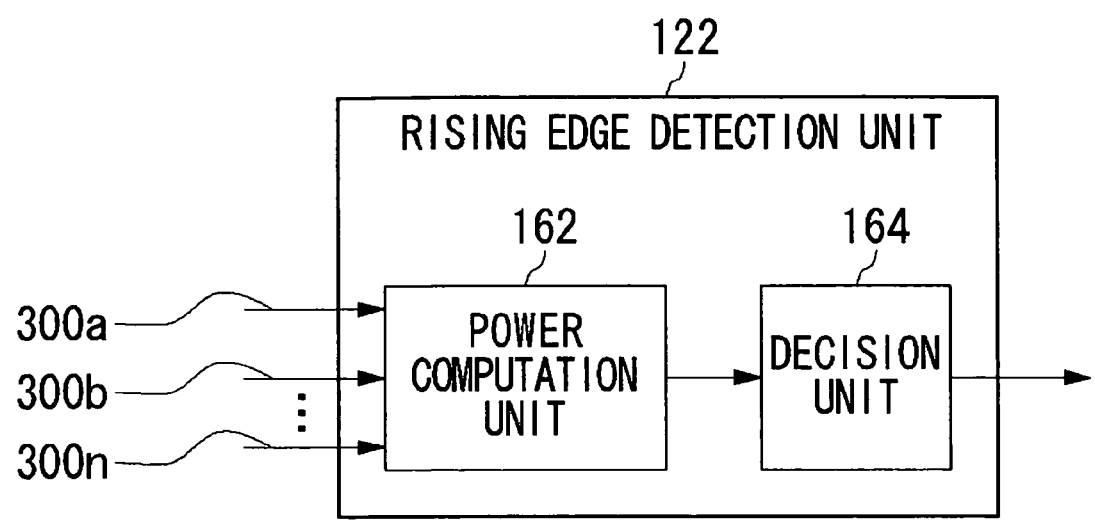
FIG. 9 shows a structure of a rising edge detection unit shown in FIG. 4.

FIG. 9 shows the structure of the rising edge detection unit 122 included in the signal processing unit 110. The rising edge detection unit 122 includes a power computation unit 162 and a decision unit 164. The power computation unit 162 computes the received power of each baseband received signal 300 and then sums up the received power of each baseband received signal to acquire the whole power of the signals which are received by all the antennas 134.

The decision unit 164 compares the whole received power of the signals with a predetermined condition and decides that the start of the burst signal is detected when the condition is satisfied.

Figure 10:
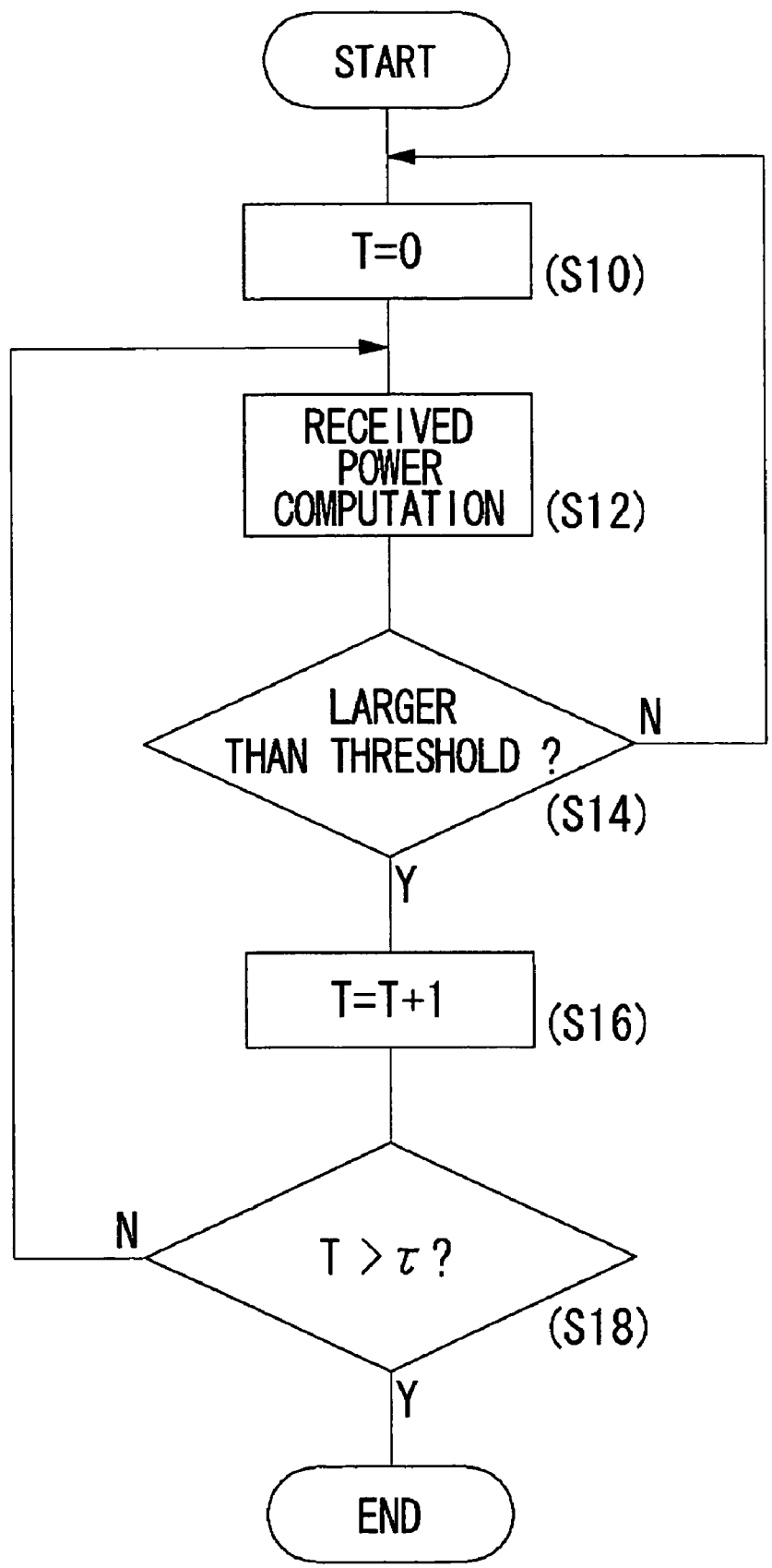
FIG. 10 shows an operation procedure of the rising edge detection unit shown in FIG. 9.

FIG. 10 shows the operation of the rising edge detection unit 122. The decision unit 164 sets an internal counter T to zero (S10). The power computation unit 162 computes the received power from the baseband received signals 300 (S12). The determination unit 164 compares the received power with a threshold value. When the received power is larger than the threshold value (Y in S14), the decision unit 164 adds 1 to the T (S16). When the T becomes larger than a predetermined value τ (Y in S18), it is decided that the start of the burst signal is detected. The processing described-above is repeated until the start of the burst signal is detected (N in S14, N in S18).

Figure 11:
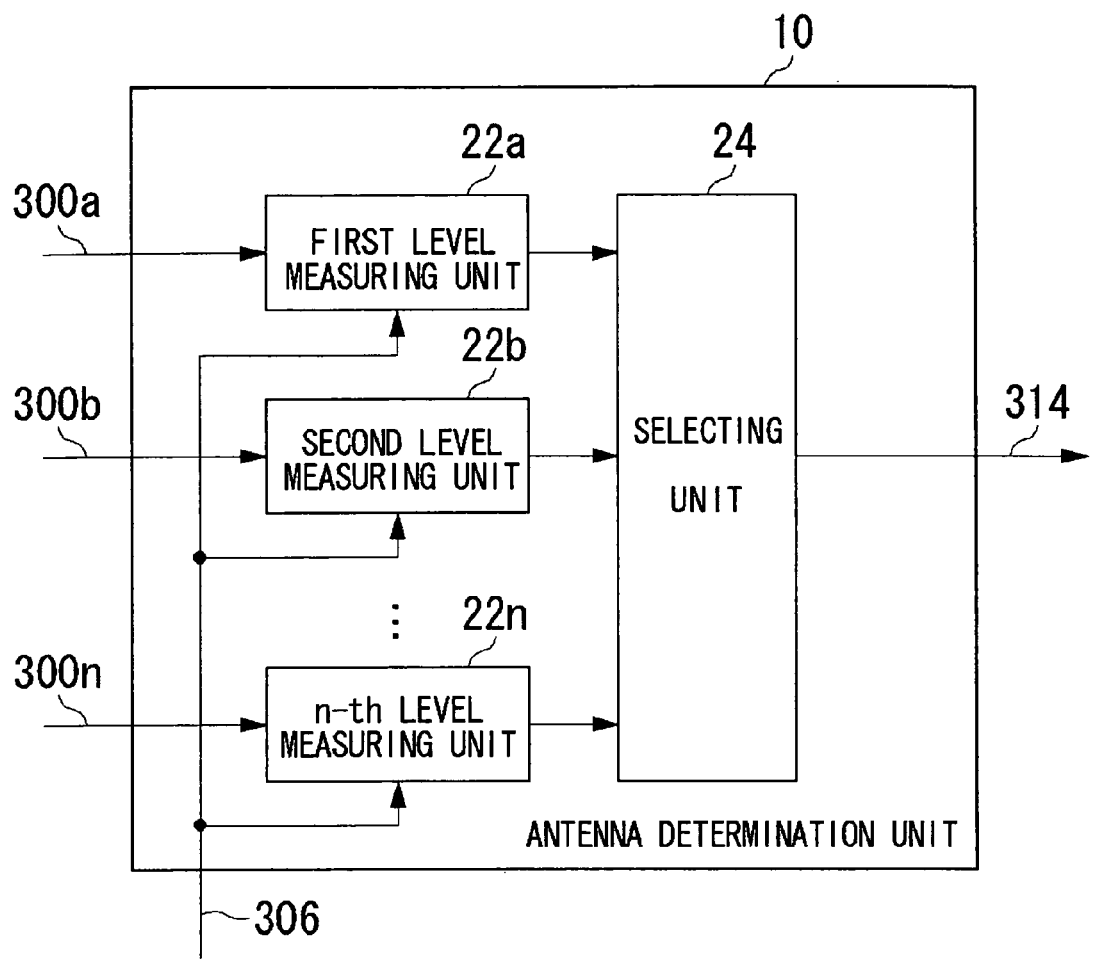
FIG. 11 shows a structure of an antenna determination unit shown in FIG. 4.

FIG. 11 shows the structure of the antenna determination unit 10. The antenna determination unit 10 includes: a first level measuring unit 22a, a second level measuring unit 22b, . . . and a n-th level measuring unit 22n which are generically called level measuring units 22; and a selecting unit 24.

The level measuring units 22 detect the start timing of the burst signal based on the control signal 306 and measure the electric power of each baseband received signal 300 during prescribed interval from the start timing.

The selecting unit 24 selects the baseband received signal 300 which has the largest electric power by comparing the electric power of each baseband received signal 300 and then outputs a result as the antenna selection signal 314.

Figure 12:
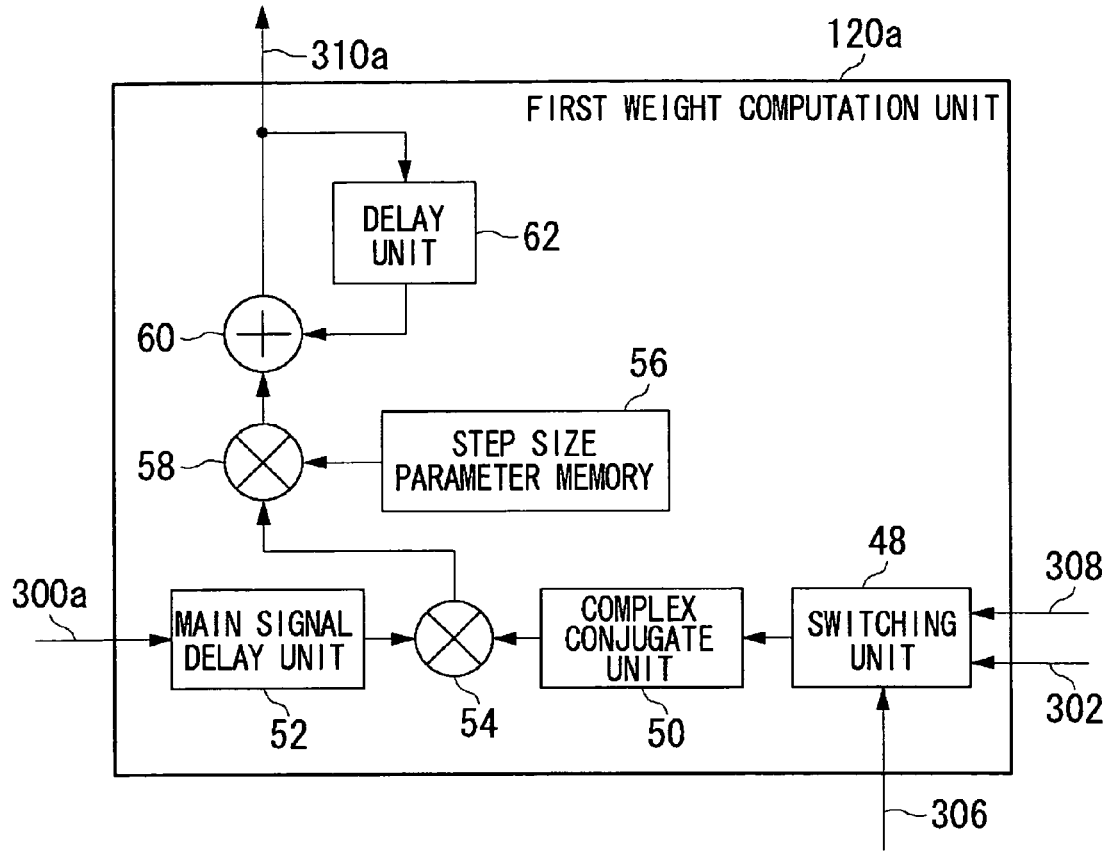
FIG. 12 shows a structure of a first weight computation unit shown in FIG. 4.

FIG. 12 shows the structure of the first weight computation unit 120a. The first weight computation unit 120a includes a switching unit 48, a complex conjugate unit 50, a main signal delay unit 52, a multiplication unit 54, a step size parameter memory 56, a multiplication unit 58, a summing unit 60, and a delay unit 62.

The switching unit 48 selects the training signal 302 in the interval of the training signals 302 by detecting the start timing of the burst signal and the end timing of interval of the training signal 302 based on the control signal 306 and then selects the error signal 308 in the interval of the data signal.

The main signal delay unit 52 delays the first baseband received signal 300a so that the first baseband received signal 300a might synchronize with the timing detected by the rising edge detection unit 122.

The multiplication unit 54 generates a first multiplication result by multiplying the phase error 308 after complex conjugate transform in the complex conjugate unit 50 by the first baseband received signal 300a which is delayed by the main signal delay unit 52.

The multiplication unit 58 generates a second multiplication result by multiplying the first multiplication result by a step size parameter stored in the step size parameter memory 56. The second multiplication result is fed back by the delay unit 62 and the summing unit 60 and added to a new second multiplication result. The result of the summation is then sequentially updated by the LMS algorithm. This summation result is outputted as the first weighting coefficient 310a.

Figure 13:
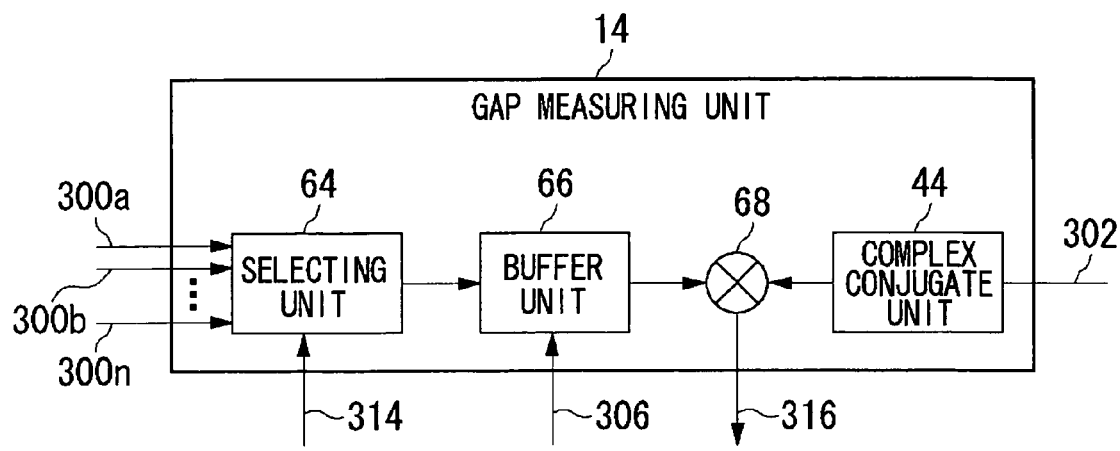
FIG. 13 shows a structure of a gap measuring unit shown in FIG. 4.

FIG. 13 shows the structure of the gap measuring unit 14. The gap measuring unit 14 includes a complex conjugate unit 44, a selecting unit 64, a buffer unit 66 and a multiplication unit 68.

The selecting unit 64, based on the antenna selection signal 314, selects the baseband received signal 300 corresponding to the one initial weighting coefficient 320 which has been made effective in the interval of the training signal 302.

The buffer unit 66 detects the start timing of the burst signal based on the control signal 306 and outputs the baseband received signal 300 at the start timing.

The multiplication unit 68 multiplies the training signal 302 after the complex conjugate processing in the complex conjugate unit 44 by the one baseband received signal 300 outputted from the buffer unit 66 and then outputs the gap error signal 316. Here, it is presumed that both the training signal 302 and baseband received signal 300 are the head signal of the burst signal.

Figure 14:
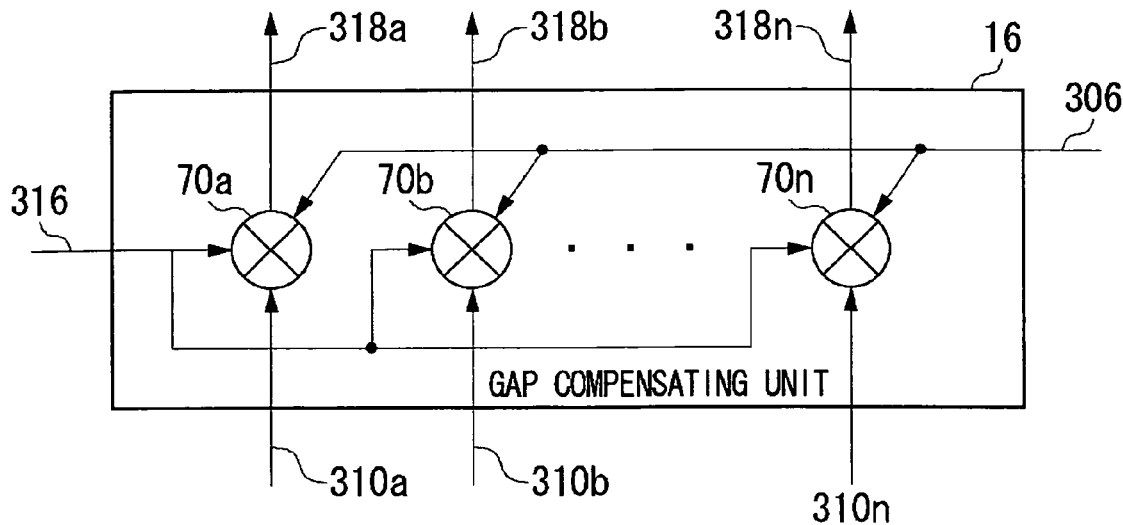
FIG. 14 shows a structure of a gap compensating unit shown in FIG. 4.

FIG. 14 shows the structure of the gap compensating unit 16. The gap compensating unit 16 includes a first multiplication unit 70a, a second multiplication unit 70b, . . . and a n-th multiplication unit 70n which are generically named multiplication units 70.

The multiplication units 70 detect the end timing of the interval of the training signal 302 based on the control signal 306. Then the multiplication units 70 multiply the control weighting coefficients 310 by the gap error signal 316 and outputs the updated weighting coefficients 318.

Figure 15:
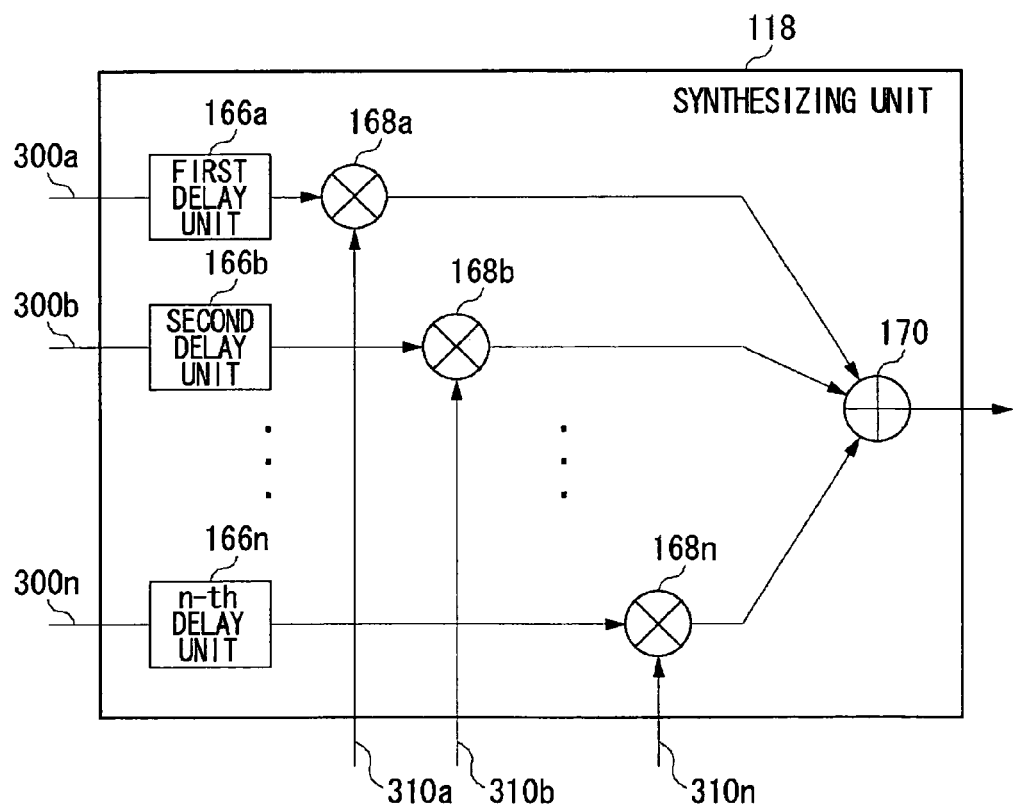
FIG. 15 shows a structure of a synthesizing unit shown in FIG. 4.

FIG. 15 shows the structure of the synthesizing unit 118 which is included in the signal processing unit 110. The synthesizing unit 118 includes: a first delay unit 166a, a second delay unit 166b, . . . and a n-th delay unit 166n which are generically named delay units 166; a first multiplication unit 168a, a second multiplication unit 168b, . . . and a n-th multiplication unit 168n which are generically named multiplication units 168; and a summing unit 170.

Since the delay time of the delay units 166 is from the detection of the head of the burst signal by the rising edge detection unit 122 until setting the weighting coefficients 322 by the initial weight data setting unit 12 via the weight switching unit 18, the processing delay of the delay units 166 can be ignored in general. Therefore, synthesizing processing with less processing delay can be realized.

The multiplication units 168 multiply the baseband received signals 300 which are delayed by the delay units 166 by the weighting coefficients 322. The summing unit 170 sums up the whole results of the multiplications by the multiplications units 168.

Hereunder will be described the operation of the receiver 106 having the structure described above. The signals received by the plurality of antennas 134 are translated to the baseband received signals 300 by the quadrature detection and so forth. When the rising edge detection unit 122 detects the starts of the burst signals from the baseband received signals 300, the interval of the training signal 302 is started. At the start timing of the interval of the training signal 302, the antenna determination unit 10 selects the one baseband received signal 300. Then the initial weight data setting unit 12 sets the initial weighting coefficients 320, where the only initial weighting coefficient 320 corresponding to the selected baseband received signal 300 is made effective.

In the interval of the training signal 302, the weight switching unit 18 outputs the initial weighting coefficients 320 as the weighting coefficients 322 and the synthesizing unit 118 sums up the baseband received signals 300 weighting them with the weighting coefficients 322. Meanwhile, the weight computation units 120 update the control weighting coefficients 310 by the LMS algorithm. In the interval of the data signal, the gap compensating unit 16 compensates the control weighting coefficients 310 with the gap error signal 316 computed in the gap measuring unit 14 and then outputs them as the updated weighting coefficients 318. Moreover, the weight switching unit 18 outputs the updated weighting coefficients 318 as the weighting coefficients 322 and the synthesizing unit 118 weights the baseband received signals 300 with the weighting coefficients 322 and sums them up.

According to the first embodiment, the processing delay can be reduced since the synthesizing processing is performed even in the interval of the training signal regardless of the convergence of the weighting coefficients. Moreover, communications with surrounding radio stations located in the vicinity can be realized since the omni antenna pattern is utilized for the weighting coefficients in the interval of the training signal. The weighting coefficients can be smoothly switched between the omni antenna pattern and the adaptive array antenna pattern.

SECOND EMBODIMENT

In the second embodiment, same as the first embodiment, received signals are weighted with weighting coefficients and synthesized. The processing delay hardly occurs since the switching is performed between the omni antenna pattern which is precedently prepared and the adaptive array pattern updated by the LMS algorithm. In the first embodiment, the switching of the weighting coefficients between two types is performed in an undifferentiated manner at the timing where the training signal included in the burst signal ends. On the other hand, in the second embodiment, the switching of weighting coefficients between two types is performed adaptively at the timing where the LMS algorithm converges within a predetermined range.

Figure 16:
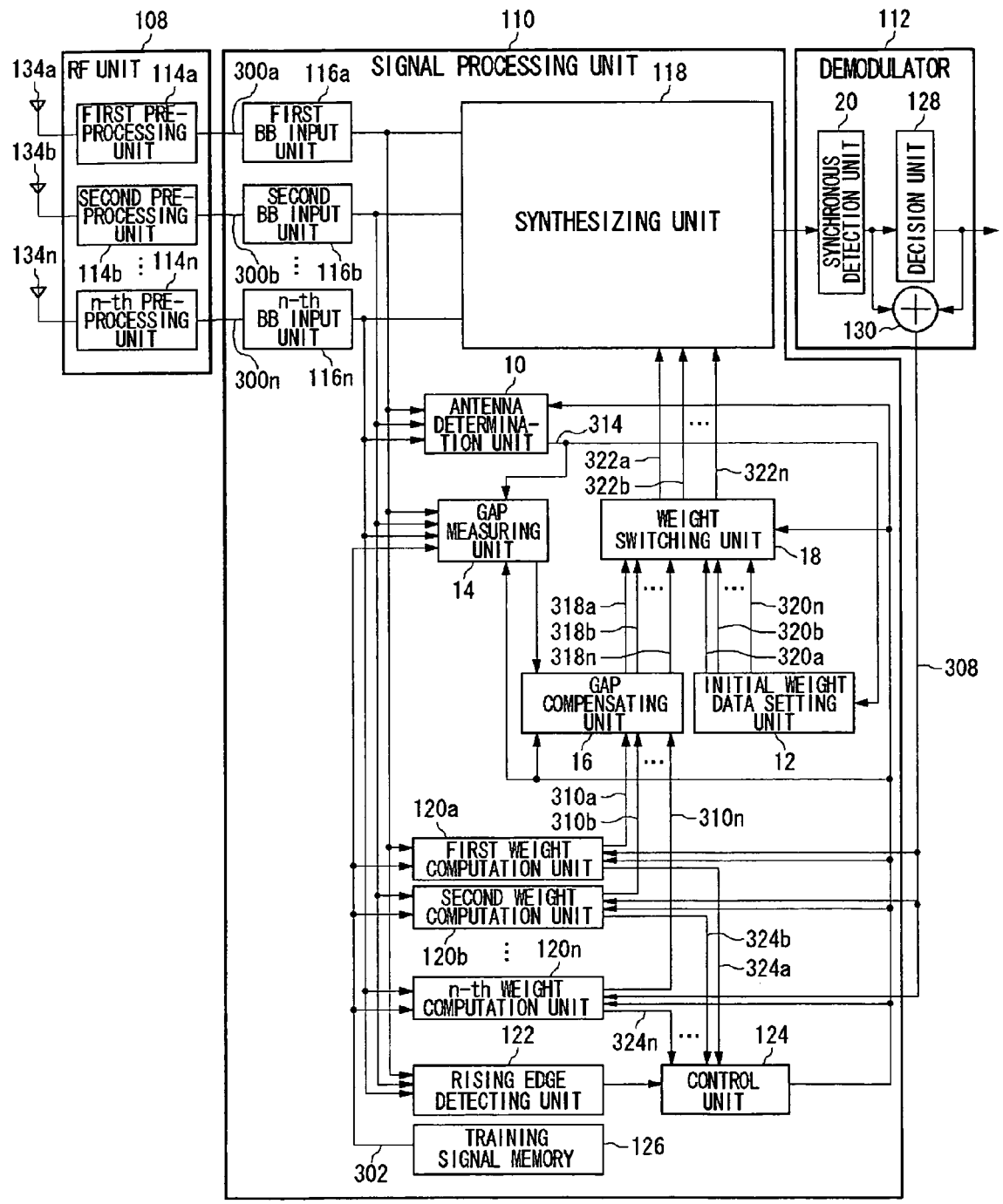
FIG. 16 shows a structure of a receiver according to a second embodiment of the present invention.

FIG. 16 shows the structure of the receiver 106 according to the second embodiment. The structure thereof is almost same as the structure of the receiver 106 shown in FIG. 4. However, the receiver 106 shown in FIG. 16 includes a first convergence information 324a, a second convergence information 324b, ... and a n-th convergence information 324n which are generically named convergence information 324.

The weight switching unit 18 shown in FIG. 4 performs the switching operation in a manner that the initial weighting coefficient 320 is selected in the interval of the training signal 302 and the updated weighting coefficient is selected in the interval of the data signal, wherein the end timing of the interval of the initial weighting coefficients 320 severs as a trigger for the weight switching unit 18. On the other hand, the weight switching unit 18 utilizes the timing where the control weighting coefficients 310 converge in the weight computation units 120 (hereinafter this timing is referred to as a "convergence timing"). The convergence timing is generated by the control unit 124 when the fluctuation of the control weighting coefficients 310 caused by updating them converges within in a range, wherein the range is determined precedently. Alternatively, the convergence timing may be generated by the control unit 124 when the updated error signal 308 becomes within a range, wherein the range is predetermined for the error signal 308.

The control unit 124 notifies the convergence timing to each unit in accordance with the necessity, and each unit performs its assigned processing according to the convergence timing.

Figure 17:
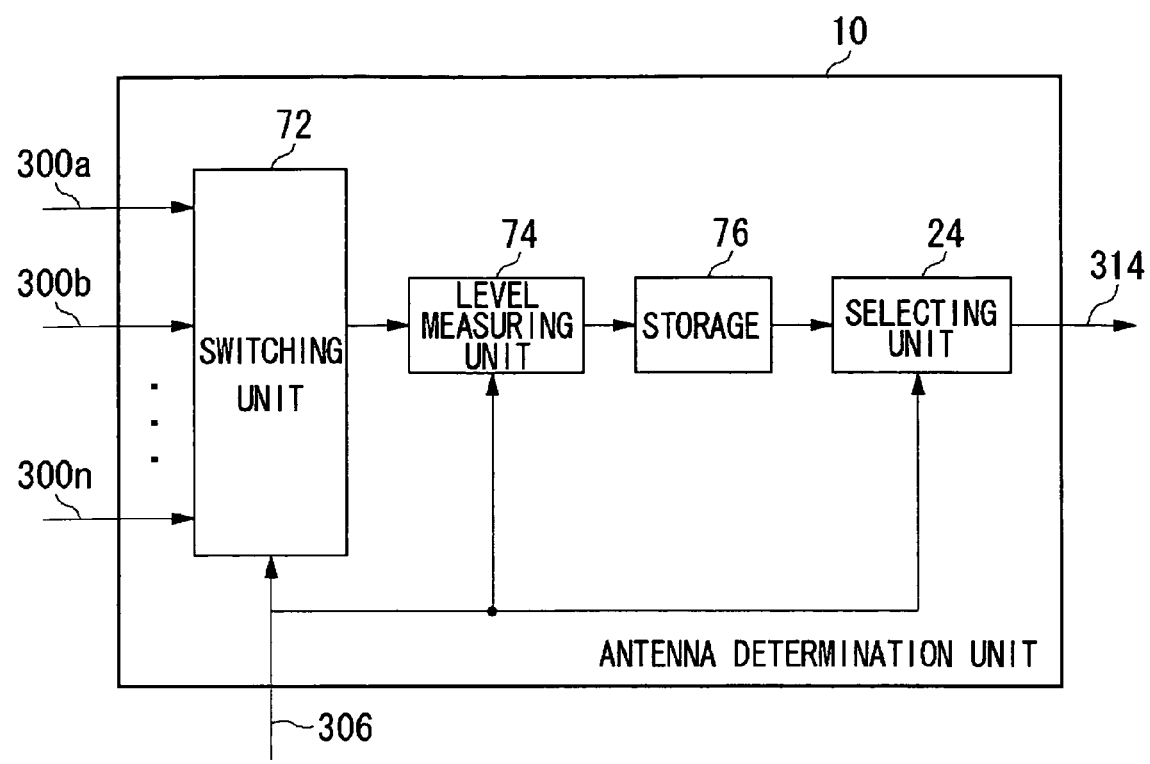
FIG. 17 shows a structure of an antenna determination unit shown in FIG. 16.

FIG. 17 shows the structure of the antenna determination unit 10. The antenna determination unit 10 includes a switching unit 72, a level measuring unit 74, a storage 76 and a selecting unit 24.

The switching unit 72 switches the plurality of baseband received signals 300 at a prescribed timing and outputs one baseband received signal 300. The switching may be performed on the plurality of burst signals.

The level measuring unit 74 measures the electric power of the baseband received signal 300 selected by the switching unit 72. Being different from the antenna determination unit 10 shown in FIG. 11, the electric power of the plurality of baseband received signals 300 is not measured at a time but measured for every baseband received signal 300 one by one, therefore the size of an arithmetic circuit for the level measuring unit 74 can be diminished.

The storage 76 stores the computed electric power of the baseband received signal 300.

Figure 18:
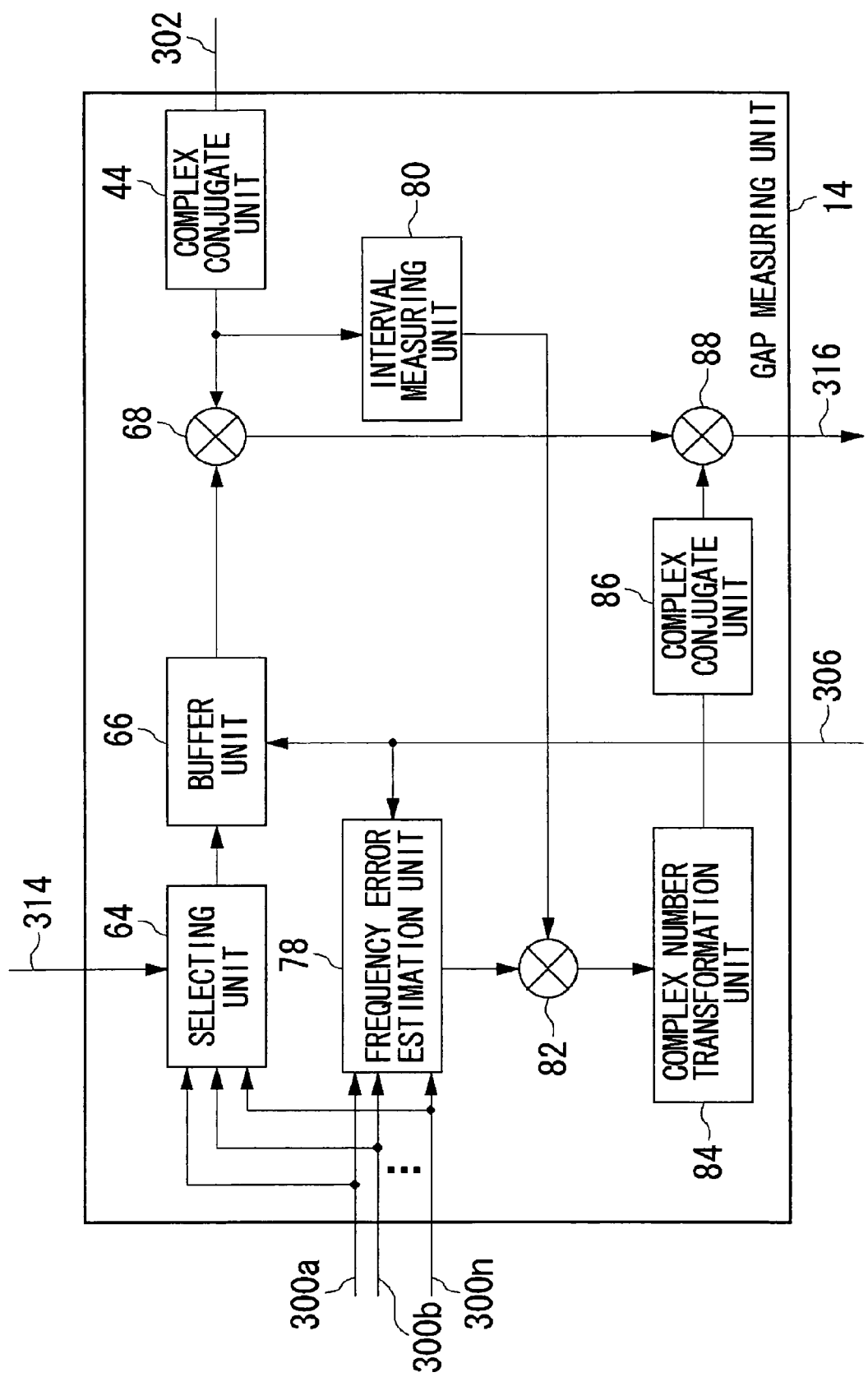
FIG. 18 shows a structure of a gap measuring unit shown in FIG. 16.

FIG. 18 shows the structure of the gap measuring unit 14. The gap measuring unit 14 shown in FIG. 18 is structured by adding a frequency error estimation unit 78, an interval measuring unit 80, a multiplication unit 82, a complex number transformation unit 84, a complex conjugate unit 86 and a multiplication unit 88 to the gap measuring unit 14 shown in FIG. 13.

In the second embodiment, being different from the first embodiment, the timing where the weight computation units 120 start updating the control weight coefficients 310 is the head of the long preamble of the burst format shown in FIG. 3. The control weighting coefficient 310wi updated from the head of the long preamble is given by the expression (5) below. Here, it is presumed that the control weighting coefficients 310 have converged sufficiently.

$$\sum h_i w_i \exp(j\Delta \omega sT) = 1 \tag{5}$$

Here, sT is the time length of a short preamble interval. By performing the synthesizing processing based on the expression (5), the synthesis result is given by:

$$y(t) = S(t)\exp(j\Delta \omega t)\exp(-j\Delta \omega sT) + n(t) \tag{6}$$

By comparing these expressions, the gap error signal 316C can be expressed as follows.

$$C = h_i \exp(-j\Delta\omega sT) \quad (7)$$

The frequency error estimation unit 78 estimates a frequency error Δω based on the baseband received signals 300. The interval measuring unit 80 measures the time sT of the short preamble interval based on the training signal 302.

The multiplication unit 82 multiplies the frequency error by the time of the short preamble interval and acquires the phase error in the interval of the short preamble. This phase error is transformed to a complex number by the complex number transformation unit 84 and a complex conjugate processing is performed thereon by the complex conjugate unit 86.

The multiplication unit 88 multiplies, by the above-described phase error, the result of the multiplication processing on the one baseband received signal 300 and the complex conjugated training signal 302, and then generates the gap error signal 316.

Figure 19:
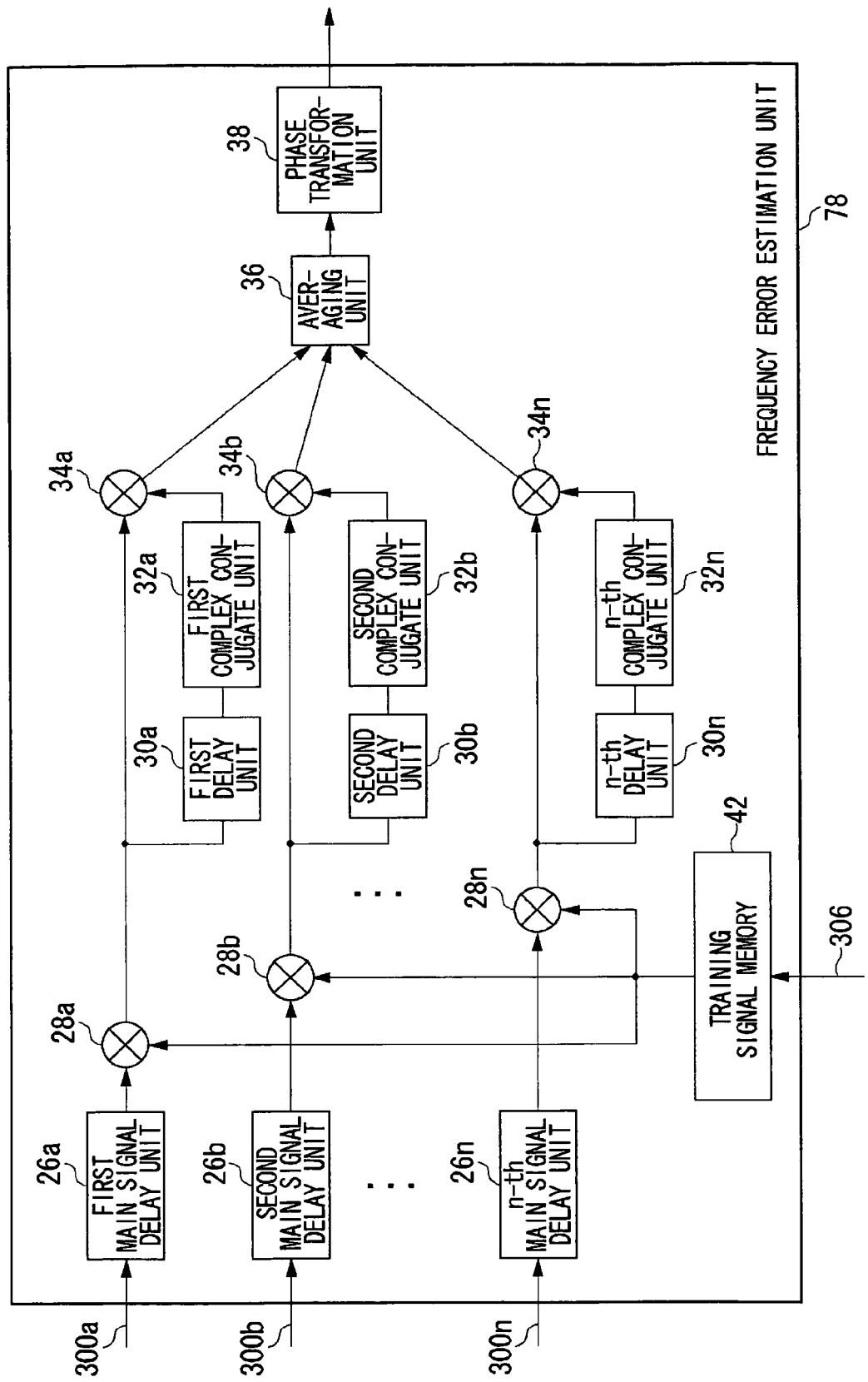
FIG. 19 shows a structure of a frequency error estimation unit shown in FIG. 18.

FIG. 19 shows the structure of the frequency error estimation unit 78. The frequency error estimation unit 78 includes: a first main signal delay unit 26a, a second main signal delay unit 26b, ... and a n-th main signal delay unit 26n which are generically named main signal delay units 26; a first multiplication unit 28a, a second multiplication unit 28b, ... and a n-th multiplication unit 28n which are generically named multiplication units 28; a first delay unit 30a, a second delay unit 30b, ... and a n-th delay unit 30n which are generically named delay units 30; a first complex conjugate unit 32a, a second complex conjugate unit 32b, ... and a n-th complex conjugate unit 32n which are generically named complex conjugate units 32; a first multiplication unit 34a, a second multiplication unit 34b, ... and a n-th multiplication unit 34n which are generically named multiplication units 34; an averaging unit 36; a phase transformation unit 38; and a training signal memory 42.

The multiplication units 28 acquires a received signal Zi(t) which does not include transmission signal component by multiplying the baseband received signals 300 delayed in the main signal delay units 26 by the training signal 302 after the complex conjugate transform. The received signal Zi(t) is given by:

$$Z_i(t) = x_i(t)S*(t) \quad (8)$$
$$= h_i \exp(j\Delta\omega t)$$

Here, it is assumed that a noise is sufficiently small and therefore the noise is ignored.

The delay units 30 and the complex conjugate units 32 delay the Zi(t) and then transform the Zi(t) to the complex conjugate. The Zi(t) transformed to the complex conjugate is multiplied by the original Zi(t) in the multiplication units 34. The result Ai of the multiplication is given by:

$$A_i(t) = Z_i(t)Z_i^*(t-T) \quad (9)$$
$$= \exp(j\Delta\omega t)$$

Here, the delay time of the delay units 30 is set to the symbol interval T.

The averaging unit 36 averages the multiplication results corresponding to each antenna. The multiplication results of which the time is shifted may also be utilized.

The phase transformation unit 38 transforms the averaged multiplication result A to a phase signal B by utilizing an arc tangent ROM.

$$B = \Delta\omega T \quad (10)$$

Figure 20:
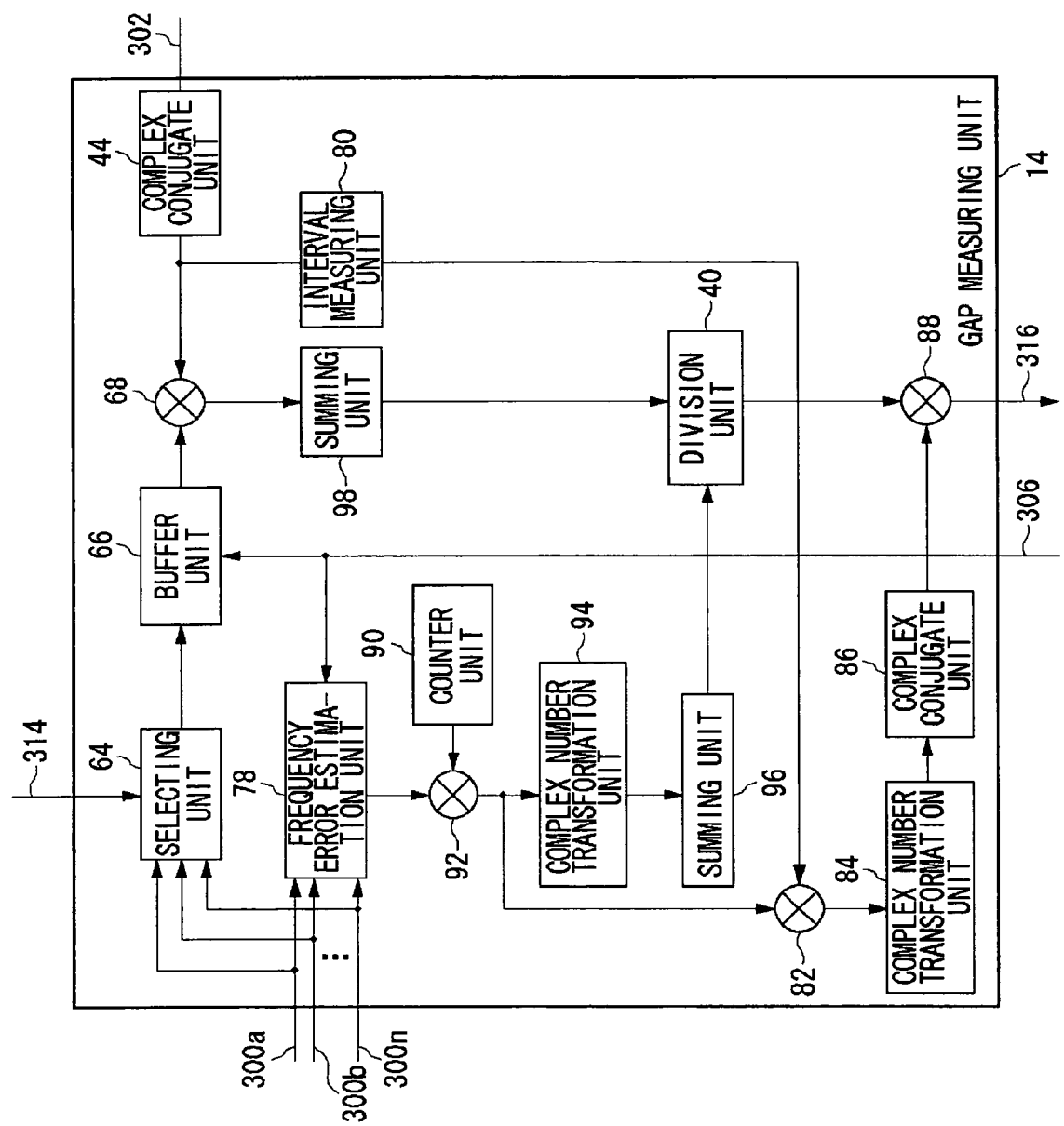
FIG. 20 shows a structure of a gap measuring unit shown in FIG. 16.

FIG. 20 shows the structure of a gap measuring unit 14 which is different from the gap measuring unit 14 shown in FIG. 18. The gap measuring unit 14 shown in FIG. 20 is structured by adding a counter unit 90, a multiplication unit 92, a complex number transformation unit 94, a summing unit 96, a summing unit 98 and a division unit 40 to the gap measuring unit 14 shown in FIG. 18. In the gap measuring unit 14 shown in FIG. 18, the multiplication of the baseband received signals 300 by the training signal 302 is performed only on the head signal of the burst signal. On the other hand, in the gap measuring unit 14 shown in FIG. 20, the multiplications are performed during prescribed time and the results thereof are averaged.

The summing unit 98 sums up the results of the multiplications by the multiplications unit 96 during prescribed time interval (hereinafter referred to as "averaging time") in order to average the results of the multiplications of the baseband received signals 300 by the training signal 302.

The counter unit 90 counts up the symbol intervals in order to acquire the phase error corresponding to the averaging time based on the frequency error outputted from the frequency error estimation unit 78. The multiplication unit 92 acquires the phase error corresponding to each counter value by respectively multiplying each counter value by the frequency error. The phase errors are transformed to complex numbers in the complex number transformation unit 94 and are summed up in the summing unit 96 within the averaging time.

The division unit 40 divides the results of the multiplications summed up by the summing unit 98 with the phase errors summed up by the summing unit 96. The succeeding processings are same as those of the gap measuring unit 14 shown in FIG. 18.

Hereunder will be described the operation of the receiver 106 having the structure described above. The signals received by the plurality of antennas 134 are transformed to the baseband received signals 300 by the quadrature detection and so forth. When the rising edge detection unit 122 detects the start timings of the burst signals from the baseband received signals 300, the interval of the training signal 302 is started. At the start timing of the interval of the training signal 302, the antenna determination unit 10 selects the one baseband received signal 300 and the initial weight data setting unit 12 sets the initial weighting coefficients 320 among which only the one initial weighting coefficient 320 corresponding to the selected baseband received signal 300 is made effective. Thereafter, the weight switching unit 18 outputs the initial weighting coefficients 320 as the weighting coefficients 322 and the synthesizing unit 118 weights the baseband received signals 300 with the weighting coefficients 322 and sums them up.

Meanwhile, the weight computation units 120 update the control weighting coefficients 310 by the LMS algorithm. When the control weighting coefficients 310 converge within the prescribed range, the gap compensating unit 16 compensates the control weighting coefficients 310 with the gap error signal 316 computed in the gap measuring unit 14 according to the instruction from the control unit 124 and then outputs them as the updated weighting coefficients 318. Moreover, weight switching unit 18 outputs the updated weighting coefficients 318 as the weighting coefficients 322 and the synthesizing unit 118 weights the baseband received signals 300 with the weighting coefficients 322 and sums them up.

According to the second embodiment, the synthesis processing is performed regardless of the convergence of the weighting coefficients even in the interval of the training signal. Therefore, the processing delay can be reduced. Moreover, in the case that the adaptive algorithm converges during the training signal interval, the response characteristic can be improved by reflecting it to the weighting coefficients. This is because the switching of the weighting coefficients between two types is performed based on the convergence timing of the adaptive algorithm.

Although the present invention has been described by way of exemplary embodiments, it should be understood that many changes and substitutions may be made by those skilled in the art without departing from the scope of the present invention which is defined by the appended claims.

In the embodiments, the initial weight data setting unit 12 sets the effective value for the initial weighting coefficient 320 for the one baseband received signal 300 selected by the antenna determination unit 10, which has the largest electric power, and the unit 12 sets the value which is not effective for the other initial weighting coefficients 320. The initial weighting coefficients 320, however, do not necessarily need to be set based on the electric power. For example, one fixed initial weighting coefficient 320 may be set to the effective value and the other initial weighting coefficients 320 may be set to the value that is not effective. In that case, the antenna determination unit 10 becomes unnecessary.

In the embodiments, the initial weight data setting unit 12 sets the effective value for the initial weighting coefficient 320 for the one baseband received signal 300 selected by the antenna determination unit 10, which has the largest electric power, and the unit 12 sets the value which is not effective for the other initial weighting coefficients 320. It is, however, not necessarily required to set the weighting of the omni antenna pattern for the initial weighting coefficients 320. For example, the setting may be performed on the updated weighting coefficients 318 or the control weighting coefficients 310 which are utilized in the already received burst signal. When the fluctuation of the radio transmission environment is small, it is estimated that this setting will not cause a serious degradation of the response characteristic.

In the embodiments, the weight computation units 120 utilize the LMS algorithm as the adaptive algorithm. However, another algorithm such as the RLS algorithm may be utilized. Moreover, the weighting coefficients may not be updated. That is, it is sufficient if the adaptive algorithm is selected in accordance with the estimated radio transmission environment, the size of arithmetic circuits or the like.

In the first embodiment, the rising edge detection unit 122 computes the electric power of the baseband received signals 300 and detects the rising edge of the burst signal based on the computation result. The rising edge of the burst signal may be, however, detected by implementing another structure. For example, the rising edge may be detected by a matched filter which is shown as the structure of the timing detection unit 144. That is, it is sufficient if the rising edge of the burst signal is detected accurately.

In the first embodiment, the training signal interval is the time where the initial weighting coefficients 320 are changed into the weighting coefficients 322. However, the time does not need to be limited to the interval of the training signal. For example, the time may be shorter than the interval of the training signal. That is, the time can be set according to the length of the interval of the training signal and to the required estimation accuracy.

In the second embodiment, the delay time of the delay units 30 which are included in the frequency error estimating unit 78 is set to 1 symbol. The delay time, however, is not limited to 1 symbol. For example, the delay time may be 2 symbols or may be symbols in the interval between the start and end of the training signal. That is, it is sufficient if an optimum delay time of the delay units 30 is decided in accordance with the stability of the frequency oscillator and with the required accuracy of the frequency offset estimation.

What is claimed is:

1. A method for processing a received signal, the method comprising:
   receiving, from a transmitter, a first signal from a first antenna terminal and a second signal from a second antenna terminal wherein the first signal and the second signal each contains at least one packet having a training interval and a data interval;
   detecting a first rising edge from the first signal;
   detecting a second rising edge from the second signal;
   generating a timing control signal, based on the first rising edge or the second rising edge;
   using a first set of weighting factors to select the first signal or the second signal;
   correlating the first and second signals with a stored reference signal in a period during which the first set of weighting factors is used, to determine a second set of weighting factors; and
   applying the second set of weighting factors to an array synthesizer, after the period during which the first set of weighting factors is used.

2. A method according to claim 1, further receiving, from the transmitter, a third signal from a third antenna terminal wherein the third signal contains at least one packet having a training interval and a data interval.

3. A method according to claim 1, further comprising:
   measuring a channel response of the first signal or the second signal; and
   using the measured channel response to generate a gap error signal for correcting a phase gap in an output signal of the array synthesizer.

4. A method according to claim 3, further comprising updating the second set of weighting factors, based on the gap error signal.

5. A receiver comprising:
   an input unit configured to receive, from a transmitter, a first signal from a first antenna terminal and a second signal from a second antenna terminal wherein the first signal and the second signal each contains at least one packet having a training interval and a data interval;
   a rising edge detection unit configured to detect a first rising edge from the first signal, to detect a second rising edge from the second signal, and to generate a timing control signal, based on the detected first rising edge or second rising edge;
   an initial weight data setting unit configured to use a first set of weighting factors to select the first signal or the second signal;
   a weight computation unit configured to correlate the first and second signals with a stored reference signal in a period during which the first set of weighting factors is used, to determine a second set of weighting factors; and a weight switching unit configured to apply the second set of weighting factors to an array synthesizer, after the period during which the first set of weighting factors is used.

6. A receiver according to claim 5, wherein the input unit is configured to receive, from the transmitter, a third signal from a third antenna terminal wherein the third signal contains at least one packet having a training interval and a data interval.

7. A receiver according to claim 5, further comprising a gap measuring unit configured to measure a channel response of the first signal or the second signal and to use the measured channel response to generate a gap error signal for correcting a phase gap in an output signal of the array synthesizer.

8. A receiver according to claim 7, further comprising a gap compensating unit configured to update the second set of weighting factors, based on the gap error signal.

9. A method for processing a received signal, the method comprising:
receiving, from a transmitter, a first signal from a first antenna terminal and a second signal from a second antenna terminal wherein the first signal and the second signal each contains at least one packet having a training interval and a data interval;
detecting a first rising edge from the first signal;
detecting a second rising edge from the second signal;
generating a timing control signal, based on the first rising edge or the second rising edge;
using a first set of weighting factors to select the first signal or the second signal;
performing an adaptive algorithm on the first and second signals in a period during which the first set of weighting factors is used, to determine a second set of weighting factors; and
applying the second set of weighting factors to an array synthesizer, after the period during which the first set of weighting factors is used.

10. A method according to claim 9, further receiving, from the transmitter, a third signal from a third antenna terminal wherein the third signal contains at least one packet having a training interval and a data interval.

11. A method according to claim 9, further comprising:
measuring a channel response of the first signal or the second signal; and
using the measured channel response to generate a gap error signal for correcting a phase gap in an output signal of the array synthesizer.

12. A method according to claim 11, further comprising updating the second set of weighting factors, based on the gap error signal.

13. A receiver comprising:
an input unit configured to receive, from a transmitter, a first signal from a first antenna terminal and a second signal from a second antenna terminal wherein the first signal and the second signal each contains at least one packet having a training interval and a data interval;
a rising edge detection unit configured to detect a first rising edge from the first signal, to detect a second rising edge from the second signal, and to generate a timing control signal, based on the detected first rising edge or second rising edge;
an initial weight data setting unit configured to use a first set of weighting factors to select the first signal or the second signal;
a weight computation unit configured to perform an adaptive algorithm on the first and second signals in a period during which the first set of weighting factors is used, to determine a second set of weighting factors; and
a weight switching unit configured to apply the second set of weighting factors to an array synthesizer, after the period during which the first set of weighting factors is used.

14. A receiver according to claim 13, wherein the input unit is configured to receive, from the transmitter, a third signal from a third antenna terminal wherein the third signal contains at least one packet having a training interval and a data interval.

15. A receiver according to claim 13, further comprising a gap measuring unit configured to measure a channel response of the first signal or the second signal and to use the measured channel response to generate a gap error signal for correcting a phase gap in an output signal of the array synthesizer.

16. A receiver according to claim 15, further comprising a gap compensating unit configured to update the second set of weighting factors, based on the gap error signal.

* * * * *